United States Patent
Hanna et al.

(10) Patent No.: US 9,016,445 B2
(45) Date of Patent: Apr. 28, 2015

(54) LIGHT-WEIGHT AND SOUND-DAMPED BRAKE ROTOR AND METHOD OF MANUFACTURING THE SAME

(75) Inventors: Michael D. Hanna, West Bloomfield, MI (US); Mark T. Riefe, Brighton, MI (US); Mohan Sundar, Troy, MI (US); Brent D. Lowe, Milford, MI (US); Andrew L. Bartos, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 489 days.

(21) Appl. No.: 13/292,158

(22) Filed: Nov. 9, 2011

(65) Prior Publication Data

US 2013/0112514 A1    May 9, 2013

(51) Int. Cl.
*F16D 65/12* (2006.01)
*F16D 65/00* (2006.01)
*F16D 65/02* (2006.01)

(52) U.S. Cl.
CPC .... *F16D 65/0006* (2013.01); *F16D 2065/1372* (2013.01); *F16D 2065/1376* (2013.01); *F16D 65/12* (2012.01); *F16D 2065/1316* (2013.01); *F16D 2065/132* (2013.01); *F16D 2065/1392* (2013.01)

(58) Field of Classification Search
CPC .......... F16D 65/123; F16D 2065/1316; F16D 2065/1372; F16D 2065/1376
USPC ..................................... 188/218 XL, 264 AA
See application file for complete search history.

(56) References Cited

U.S. PATENT DOCUMENTS

| | | | | |
|---|---|---|---|---|
| 3,548,979 | A | * | 12/1970 | Dernovshek et al. ... 188/264 CC |
| 3,941,221 | A | * | 3/1976 | Pringle ................... 188/218 XL |
| 4,263,992 | A | * | 4/1981 | Moore et al. ........... 188/218 XL |
| 4,448,291 | A | * | 5/1984 | Ritsema et al. ......... 188/218 XL |
| 4,930,606 | A | * | 6/1990 | Sporzynski et al. ..... 188/218 XL |
| 6,032,769 | A | * | 3/2000 | Daudi ........................ 188/218 R |
| 6,357,557 | B1 | * | 3/2002 | Di Ponio ..................... 188/18 A |
| 7,228,946 | B2 | * | 6/2007 | Baumgartner et al. . 188/218 XL |
| 7,594,568 | B2 | | 9/2009 | Hanna et al. |
| 7,644,750 | B2 | | 1/2010 | Schroth et al. |
| 7,775,332 | B2 | | 8/2010 | Hanna et al. |
| 7,937,819 | B2 | | 5/2011 | Hanna et al. |
| 7,938,378 | B2 | | 5/2011 | Hanna et al. |
| 7,950,441 | B2 | | 5/2011 | Hanna et al. |
| 7,975,750 | B2 | | 7/2011 | Dessouki et al. |
| 8,028,739 | B2 | | 10/2011 | Walker et al. |

(Continued)

OTHER PUBLICATIONS

U.S. Appl. No. 13/222,052, filed Aug. 31, 2011; First Named Inventor: Michael D. Hanna; Title: Light-Weight and Sound-Damped Brake Rotor and Method of Manufacturing the Same.

*Primary Examiner* — Bradley King
(74) *Attorney, Agent, or Firm* — Reising Ethington P.C.

(57) ABSTRACT

A light-weight and sound-damped brake rotor for a vehicle braking system includes a rotor hat and a rotor cheek supported by the rotor hat. The rotor hat includes an axially-protruding central hub and a flange that extends radially from and circumferentially around the central hub. The rotor cheek, which provides at least one braking surface, is formed from two or more separate and distinct pieces which are fixedly secured to the flange of the rotor hat. Located within the rotor cheek underneath the at least one braking surface is a vibration damping element. The brake rotor derives its vibration-deadening and sound-damping effects from the vibration damping element through the occurrence of relative frictional contacting movement.

17 Claims, 9 Drawing Sheets

(56) References Cited

U.S. PATENT DOCUMENTS

| | | |
|---|---|---|
| 8,056,233 B2 | 11/2011 | Carter et al. |
| 2008/0099289 A1 | 5/2008 | Hanna et al. |
| 2008/0185249 A1 | 8/2008 | Schroth et al. |
| 2009/0020383 A1 | 1/2009 | Hanna et al. |
| 2009/0022938 A1 | 1/2009 | Hanna et al. |
| 2009/0032211 A1 | 2/2009 | Hanna et al. |
| 2009/0032674 A1* | 2/2009 | Hanna et al. .................. 248/562 |
| 2009/0044923 A1 | 2/2009 | Hanna et al. |
| 2009/0260931 A1 | 10/2009 | Ulicny et al. |
| 2009/0260932 A1 | 10/2009 | Hanna et al. |
| 2009/0260939 A1 | 10/2009 | Golden et al. |
| 2009/0269575 A1 | 10/2009 | Hanna et al. |
| 2010/0122880 A1 | 5/2010 | Hanna et al. |

* cited by examiner

LIGHT-WEIGHT AND SOUND-DAMPED BRAKE ROTOR AND METHOD OF MANUFACTURING THE SAME

TECHNICAL FIELD

The technical field of this disclosure relates generally to a light-weight and sound-damped brake rotor for a vehicle braking system. The brake rotor includes a rotor hat and a rotor cheek. The rotor hat includes a flange extending radially from and circumferentially around a central hub. The rotor cheek is supported on the flange of the rotor hat and is formed from two or more distinct pieces which are fixedly secured to the rotor hat by any suitable approach. Located within the rotor cheek is a vibration damping element that damps vibration propagation through the brake rotor during a braking event. A method for making the light-weight and sound-damped brake rotor is also disclosed.

BACKGROUND

A motor vehicle braking system typically includes a brake rotor (sometimes called a disc brake rotor) located at one or more wheels of the vehicle. The brake rotor generally includes a rotor hat and a rotor cheek. The rotor hat is coupled to a rotatable axle to permit the brake rotor to co-rotate with the wheel when the vehicle is moving. The rotor cheek is an annular segment of the brake rotor that surrounds the rotor hat and includes at least one braking surface against which a brake pad is selectively applied when braking is desired. A pair of mutually opposed braking surfaces are typically present on each side of the rotor cheek to provide better braking capabilities through the selective clamping or gripping of opposed brake pads. Several different rotor cheek configurations have been designed. The rotor cheek may, for example, be solid or it may be vented to help dissipate heat generated at the braking surfaces.

The brake pads are normally carried by a brake caliper in close proximity to the braking surfaces. The brake caliper is supported near the brake rotor by a caliper mounting bracket that is attached to an axle hub, a steering knuckle, or some other local stationary section of the vehicle. A typical structural configuration of the brake caliper allows the brake pads to be selectively applied against the braking surfaces of the rotor cheek by way of a mechanic, hydraulic, pneumatic, or electromagnetic braking response mechanism actuated by depressing a brake pedal located in the driver compartment beneath the steering column. The resultant frictional interaction between the rotating rotor cheek and the non-rotating brake pads decreases the rotational speed of the wheel. The rate at which the rotational speed of the wheel decelerates is dependent on the pressure applied by the brake pads as governed by the braking response mechanism.

Sometimes the application of the brake pads against the braking surfaces causes undesirable vibrations to resonate through the brake rotor, the brake caliper, or both. These vibrations may be felt and heard by the passengers present in the vehicle. High frequency vibrations in the range of about 1,000 Hz to about 18,000 Hz, for example, are often associated with a noise referred to as brake squeal while low frequency vibrations below about 1,000 Hz are often associated with a variety of noises such as brake groan, moan, and howl. Any of these noises may be considered an actual or perceived driving disturbance if produced on a regular basis. The development of a light-weight brake rotor that disrupts vibration propagation during braking and, as a result, substantially subdues noise transmission, would be a welcome contribution to the vehicle braking art along with a method of manufacturing such a sound-damped brake rotor.

SUMMARY OF THE DISCLOSURE

A light-weight and sound-damped brake rotor includes a rotor hat and a rotor cheek supported by the rotor hat. Both of the rotor hat and the rotor cheek are centered about a longitudinal axis of rotation. The rotor hat is preferably made of steel and includes an axially-protruding central hub and a flange that extends radially from and circumferentially around the central hub. The rotor cheek is preferably made of two or more cast iron pieces. Those pieces are fixedly secured to the rotor hat and, when assembled, provide at least one axially-facing (with respect to the longitudinal axis of rotation) annular braking surface against which a closely-situated brake pad can be selectively applied to effectuate braking. The rotor cheek may be solid or vented.

One or more metallurgical joints and/or mechanical fasteners may be used to fixedly secure the two or more rotor cheek pieces to the rotor hat to form the rotor cheek. A metallurgical joint is a metal-to-metal bond formed between metal surfaces in which the metal surfaces were liquified, allowed to coalesce, and are then re-solidified, or where a metal filler material is melted and solidified between the metal surfaces but the metal surfaces themselves do not coalesce. Welding and brazing are two commonly-practiced and exemplary joining techniques that produce a metallurgical joint. A mechanical fastener is any fastening device located on or in contact with the rotor hat and the rotor cheek that holds those two components together in fixed relation without effectuating a metal-to-metal bond. Some examples of a mechanical fastener include rivets, bolts, screws, raised or depressed surface features formed on the flange of the rotor hat which restrict movement, and an adhesive.

A vibration damping element that damps vibration propagation through the brake rotor during a braking event is located within the rotor cheek underneath the at least one braking surface. The vibration damping element facilitates a physically distinct, non-bonded, surface-to-surface interface where relative frictional contacting movement can occur when the brake pad is applied against the braking surface. Such frictional interactions convert mechanical vibratory energy into dissipating thermal energy and ultimately weaken the proliferation of vibrations and their ability to sustain a disruptive, audible noise. Some examples of the vibration damping element are (1) a friction-enhancing coating located between a peripheral radial segment of the flange of the rotor hat and an underside of the rotor cheek and (2) a band which is independent from both the rotor hat and the rotor cheek. The band is preferably annular in shape and confined to an area of corresponding size and shape by either or both of the rotor hat and the rotor cheek.

The pieces used to make the rotor cheek are preferably a pair of annular rotor cheek halves which are positioned on opposite sides of the flange and secured by welding, brazing, a mechanical fastener such as a concentric ridge or a rivet, or any other approach able to fixedly secure the pieces to the rotor hat. Each of the rotor cheek halves provides an axially-facing annular braking surface. The two braking surfaces face in opposite directions. The use of two rotor cheek halves simplifies manufacturing of the sound-damped brake rotor by minimizing the number of rotor cheek pieces that need to be fixedly secured to the flange of the rotor hat. Of course other shaped pieces besides rotor cheek halves, such as arcuate semi-circular shaped pieces, which require more than two pieces to form the rotor cheek, may be used as well. The use of more than two rotor cheek pieces, while increasing the manufacturing complexity of the brake rotor, does not change the functionality or capability of the constructed rotor cheek.

A manufacturing method that can be employed to make the sound-damped brake rotor includes a rotor hat forming step, a vibration damping element preparation step, and a rotor cheek forming step. The rotor hat forming step involves forming the rotor hat, for example, in a stamping press from a thin steel sheet of suitable size and thickness. The vibration damping element preparation step involves providing the vibration damping element at its intended location relative to the rotor hat flange and/or the pieces that will eventually form the rotor cheek. This step may include (1) applying the friction-enhancing coating to the flange of the rotor hat or to one or more of the rotor cheek pieces so that, when the brake rotor is assembled, the friction-enhancing coating is located between the flange and the rotor cheek underneath the at least one braking surface, or (2) positioning the band in a retention feature, or a part of the retention feature, included in one or more of the rotor cheek pieces. Finally, the rotor cheek forming step involves fixedly securing the rotor cheek pieces to the rotor hat flange to form the rotor cheek over the vibration damping element. The rotor cheek pieces are fabricated by any suitable metal forming method, preferably casting, and may be hardened to improve the wear and corrosion resistance of the braking surface. Fixedly securing the rotor cheek pieces to the flange may be achieved, for example, by welding, brazing, mechanical fastening through the use of mechanical fasteners such as concentric ridges and/or rivets, or any other suitable technique. Other manufacturing steps may be performed before, during, or after these three steps as is generally understood by skilled artisans.

DETAILED DESCRIPTION

Several embodiments of a light weight, sound-damped, composite brake rotor for a vehicle braking system are shown in FIGS. 1-13. The brake rotor includes a rotor cheek, which may be solid or vented, supported on a rotor hat. The rotor cheek is formed from two or more separate and distinct cast iron pieces and, when assembled, provides a pair of oppositely-facing annular braking surfaces against which selectively applied brake pads can be pressed during braking. Located within the rotor cheek between the two oppositely-facing braking surfaces is a vibration damping element. The vibration damping element facilitates a physically distinct, non-bonded, surface-to-surface interface where relative frictional contacting movement can occur when the brake pads are applied against the braking surfaces. Such frictional interactions convert mechanical vibratory energy into dissipating thermal energy and ultimately weaken the proliferation of vibrations and their ability to sustain a disruptive, audible noise. A method for manufacturing the several disclosed brake rotors is shown schematically in FIG. 14 with reference to a generalized brake rotor illustrated in FIG. 15.

Figure 1:
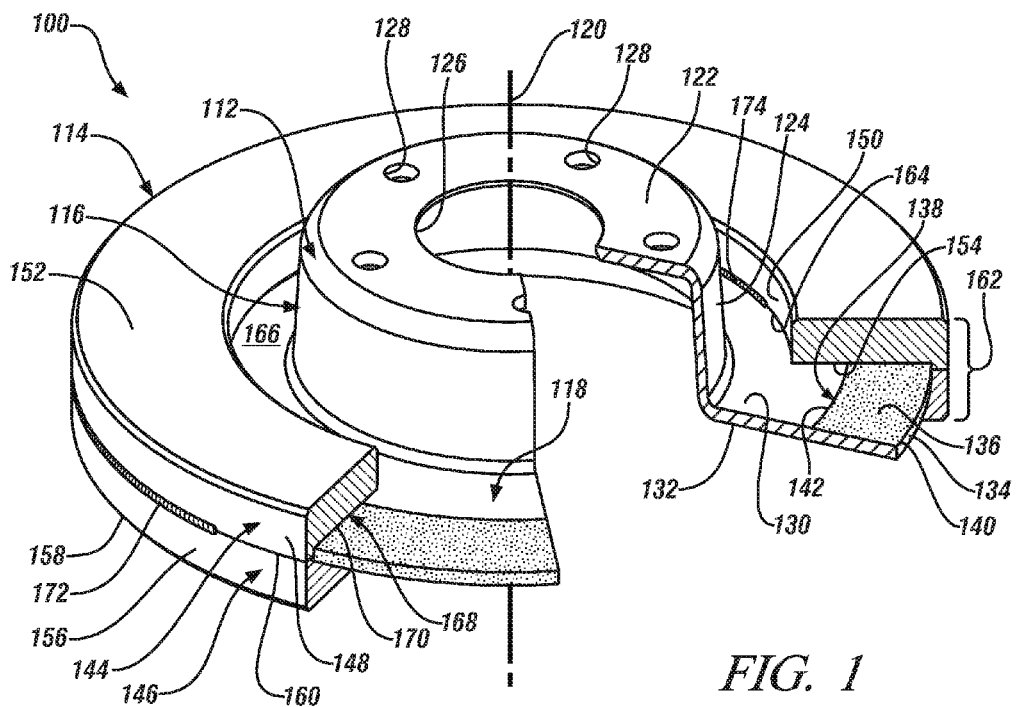
FIG. 1 is a perspective, partially cut-away view of a sound-damped brake rotor according to one embodiment of the invention in which metallurgical joints are provided to help fixedly secure the rotor cheek to the rotor hat.

FIG. 1 illustrates a brake rotor 100 according to one particular design. The brake rotor 100 includes two main components—a rotor hat 112 and a rotor cheek 114. When used as part of a vehicle braking system, the brake rotor 100 is usually mounted to a rotatable axle on an inward-facing side of the wheel within a rim that supports an inflatable tire. The brake rotor 100 co-rotates with the wheel while the vehicle is moving. A driver of the vehicle can selectively slow the rotation of the wheel at a desired pace by actuating a brake caliper located in close proximity to the brake rotor 100. The brake caliper can be of the fixed or floating type and, in general, carries a pair of opposed brake pads that can frictionally engage the rotor cheek 114 with the aid of a mechanic, hydraulic, pneumatic, or electromagnetic braking response mechanism. The actuation of the brake caliper and the force of the frictional engagement applied by the brake pads is generally controlled by a depressable foot pedal located underneath a steering column in a driver compartment of the vehicle.

The rotor hat 112 includes an axially-protruding central hub 116 and a flange 118 that extends radially from and circumferentially around the central hub 116. The flange 118 is preferably integrally formed with the central hub 116 but may be separately formed and then attached if desired. Each of the central hub 116 and the flange 118 is centered about a central longitudinal axis of rotation 120. The rotor hat 112 is preferably constructed from a steel composition that can withstand the frictional stresses and associated heat repeatedly encountered during braking. A wide variety of steels are available in sheet form and may be used to form the rotor hat 112. These steels include low carbon steels (1008 low carbon steel), mild carbon steels (1018 mild carbon steel), alloy steels (945 high-strength low-alloy steel), and stainless steels (304 and 316 stainless steel), to name but a few examples. Steel compositions such as these are strong enough and relatively heat resistant making them suitable candidates for supporting the rotor cheek 114. The thickness of the rotor hat 112 through the central hub 116 and the flange 118 typically lies anywhere between about 0.5 mm and about 8 mm.

The central hub 116 has a circular top face 122 that is axially displaced from the flange 118 and a cylindrical side wall 124 that appends the top face 122 and the flange 118. A bore 126 and a plurality of bolt holes 128 are defined by the top face 122 to facilitate attachment of the brake rotor 100 to a wheel hub (not shown) of the rotatable axle. The bore 126 is centered on the same longitudinal axis of rotation 120 as the central hub 116. The plurality of bolt holes 128 are circumferentially spaced around the bore 126. When the rotor hat 112 is mounted onto the wheel hub, the bore 126 receives a correspondingly-sized central projection of the wheel hub and the plurality of bolt holes 128 each receive a wheel stud or bolt. The wheel studs or bolts are also received by bolt holes in the wheel rim and are then capped by threaded lug nuts to affix the wheel to the wheel hub over the brake rotor 100. The size of the central hub 116 can vary based on the particular design of the brake rotor 100. But a typical diameter of the top face 122 and a typical height of the side wall 124 (i.e., the axial displacement of the top face 122 from the flange 118) is about 30-70 mm and about 15-70 mm, respectively.

The flange 118 includes a first annular surface 130, a second annular surface 132, and an edge surface 134 that connects the first annular surface 130 and the second annular surface 132 across the thickness of the flange 118. The two annular surfaces 130, 132 are flat, as shown, but do not have to be as raised or depressed surface features may be present (see, for example, FIG. 2). The edge surface 134 defines the circumference of the first and second annular surfaces 130, 132 and, in this particular embodiment, maintains a constant radius about the longitudinal axis of rotation 120 of the central hub 116 and the flange 118. One particular function of the flange 118 is to provide a base construct upon which the rotor cheek 114 can be fixedly secured. In fact, as further explained below, some or all of the first and second annular surfaces 130, 132 are intended to be covered by the rotor cheek 114. The flange 118, much like the central hub 116, can vary in size based on the particular design of the brake rotor 100. In many instances, however, the flange 118 has a radial dimension that extends from the side wall 124 of the central hub 116 to the edge surface 134 which ranges from about 10 mm to about 120 mm.

The first annular surface 130 or the second annular surface 132, or both surfaces, includes a surface-applied friction-enhancing coating 136 (shown here on the first annular surface 130). The edge surface 134 may also include this coating if desired. The friction-enhancing coating 136 is preferably applied to a peripheral radial segment 138 of the first and/or second annular surfaces 130, 132 (again, shown here on the first annular surface 130). The peripheral radial segment 138, as shown, may be a continuous annular portion that extends radially between an outer circumferential border 140, which coincides with the edge surface 134, and an inner circumferential border 142. The outer circumferential border 140 and the inner circumferential border 142 are situated on the first and/or second annular surface 130, 132 so that the friction-enhancing coating 136 is covered by at least some portion, and preferably all, of the rotor cheek 114. Anywhere from 5% to 85% of the first and/or second annular surfaces 130, 132, depending on the size and coverage of the rotor cheek 114, may be designated the peripheral radial segment 138 and be covered by the friction-enhancing coating 136. If the friction-enhancing coating 136 is applied to both the first and second annular surfaces 130, 132 of the flange 118, there is no general requirement the peripheral radial segment 138, at which the friction-enhancing coating 136 is present, on the two surfaces 130, 132 correspond with one another. The friction-enhancing coating 136 could, alternatively, be applied to corresponding portions of the rotor cheek 114 to achieve the same relative placement within the brake rotor 100, although not explicitly shown in the Figures.

The friction-enhancing coating 136 is derived from any coating composition that, when hardened, can frictionally interact with the rotor cheek 114 when vibrations are imparted to the brake rotor 100 during braking or some other set of circumstances. The friction-enhancing coating 136 preferably includes a refractory material component dispersed in a binder. The refractory material component may, for example, include regular or irregular shaped particles and/or fibers of at least one of graphite, alumina ($Al_2O_3$), silica ($SiO_2$), magnesia (MgO), calcium oxide (CaO), titania ($TiO_2$), ceria ($CeO_2$), zirconia ($ZrO_2$), cordierite (a Mg/Fe/Al silicate), mullite (an aluminum silicate), sillimanite (an aluminum silicate), spodumene (a lithium aluminum silicate), petalite (a lithium aluminum silicate), zircon ($ZrSiO_4$), silicon carbide (SiC), titanium carbide (TiC), boron carbide ($B_4C$), hafnium carbide (HfC), silicon nitride ($Si_3N_4$), titanium nitride (TiN), titanium boride ($TiB_2$), vermiculite (a phyllosilicate), kaolinite (a phyllosilicate), muscovite (a phyllosilicate), or a fire clay, to name but a few. The binder that bonds the refractory material component to the first and/or second annular surfaces 130, 132 may be any sufficiently heat-resistant binding composition such as, for example, an epoxy resin, a vinyl ester resin, a lignosulfonate binder, a calcium aluminate cement, or a wood flour cement (polyoxybenzyl methylene glycol anhydride with a wood flour filler). Two commercially available coating compositions that can be applied to the flange 118 and hardened to form the friction-enhancing coating 136 are Iron Kote and Ladle Kote. A suitable thickness for the friction-enhancing coating 136 preferably ranges anywhere from about 1 μm to about 400 μm, more preferably from about 30 μm to about 250 μm, and most preferably from about 75 μm to about 150 μm.

The rotor cheek 114 is supported by the flange 118 and concentrically surrounds the central hub 116 about the longitudinal axis of rotation 120. The rotor cheek 114 is formed from a first rotor cheek half 144 and a second rotor cheek half 146. The first rotor cheek half 144 and the second rotor cheek half 146 are located adjacent to the first annular surface 130 and the second annular surface 132, respectively, and are fixedly secured to the flange 118. The first rotor cheek half 144 includes a first outer circumferential edge 148, a first inner circumferential edge 150, an axially-facing first braking surface 152, and an underside 154. The second rotor cheek half 146 is constructed similarly to the first rotor cheek half 144 and, likewise, includes a second outer circumferential edge 156, a second inner circumferential edge (not shown), an axially-facing second braking surface 158 oriented opposite the first braking surface 152, and an underside (not shown). Any type of cast iron may be used to fabricate the first and second rotor cheek halves 144, 146 including grey cast iron, white cast iron, and ductile cast iron. Of these cast iron types, however, grey cast iron is the most preferred.

The outer circumferential edges 148, 156 of the first and second rotor cheek halves 144, 146 abut along a circumferential edge seam 160 and, together, provide a rotor cheek edge 162 that defines a circumference and radius of the rotor cheek 114. Each of the first and second rotor cheek halves 144, 146 extends radially inwardly from its respective outer circumferential edge 148, 156 and terminates at the first inner circumferential edge 150 and the second inner circumferential edge (not shown), respectively, such that the friction-enhancing coating 136, if present, is completely covered by the first and/or second rotor cheek halves 144, 146. The first inner circumferential edge 150 forms a first inner circumferential flange seam 164 with the first annular surface 130 and the second inner circumferential edge (not shown) forms a second inner circumferential flange seam (not shown) with the second annular surface 132. The first inner circumferential edge 150, moreover, preferably defines an annular gap 166 with the side wall 124 of the central hub 116 for weight reduction purposes but may extend all the way to the central hub 116 and abut the side wall 124 if desired.

The first braking surface 152 extends radially from the first outer circumferential edge 148 to the first inner circumferential edge 150. Likewise, the second braking surface 158 extends radially from the second outer circumferential edge 156 to the second inner circumferential edge (not shown). These braking surfaces 152, 158 are meant to experience pressed frictional engagement with the proximally-located brake pads carried by the brake caliper during braking of the vehicle. To improve their wear and corrosion resistance, the first or second braking surface 152, 158, or both surfaces, may be hardened by ferritic nitrocarburization (FNC). Such hardening involves diffusing nitrogen and carbon into the braking surface 152, 158 at an elevated temperature within the ferritic phase of the cast iron composition employed to make the first and second rotor cheek halves 144, 146, as further explained below.

The underside 154 of the first rotor cheek half 144 forms a first annular interfacial boundary 168 with the first annular surface 130. A second annular interfacial boundary is similarly formed between the underside (not shown) of the second rotor cheek half 146 and the second annular surface 132 although not explicitly shown. At least one of the first annular interfacial boundary 168 or the second annular interfacial boundary (not shown) includes a vibration damping interface 170 (shown here at the first annular interfacial boundary 168). The vibration damping interface 170 is formed between the underside 154 of the first rotor cheek half 144 (and/or the underside of the second rotor cheek half 146) and the friction-enhancing coating 136 applied at the peripheral radial segment 138. This interface 170 provides the brake rotor 100 of this embodiment with its vibration-deadening and sound-damping effects.

The friction-enhancing coating 136 and the underside 154 of the first rotor cheek half 144 (and/or the underside of the second rotor cheek half 146) are physically distinct surfaces that contact one another over an appreciable surface area but are not rigidly bonded together. Relative frictional contacting movement is therefore able to transpire between the friction enhancing coating 136 and the underside 154 of the first rotor cheek half 144 (and/or the underside of the second rotor cheek half 146) when the brake pads engage the first and second braking surfaces 152, 158 and impart vibrations to the brake rotor 100 through the rotor cheek 114. Such relative interfacial frictional movement converts mechanical vibratory energy into thermal energy which, in turn, disrupts vibration propagation and substantially lessens any associated noise transmission from the brake rotor 100.

The size of the first and second rotor cheek halves 144, 146 can vary depending on the design of the brake rotor 100. The radial distance separating the first outer circumferential edge 148 and the first inner circumferential edge 150 of the first rotor cheek half 144 is commonly between about 60 mm and about 200 mm, and the radial dimension of the annular gap 166 usually ranges from about 0 mm to about 30 mm. The second inner circumferential edge (not shown) preferably corresponds to the location of the first inner circumferential edge 150, but is not required to do so, and is also commonly separated from the second outer circumferential edge 156 by a radial distance of about 60 mm to about 200 mm. A typical axial thickness of the first rotor cheek half 144 (between the first braking surface 152 and the underside 154) and the second rotor cheek half 146 (measured the same as the first rotor cheek half 144) is about 30 mm to about 80 mm.

The first and second rotor cheek halves 144, 146 are secured to each other and to the flange 118 by one or more metallurgical joints. A rotor cheek edge metallurgical joint 172 situated along the circumferential edge seam 160 formed by the first and second outer circumferential edges 148, 156 fuses and secures the first and second rotor cheek halves 144, 146 together. The rotor cheek edge metallurgical joint 172 may be uninterrupted around the entire circumferential edge seem 160 or, alternatively, it may include several intermittent joints spaced circumferentially around the circumferential edge seam 160 so long as the several joints, in conjunction, are strong enough to prevent the first and second rotor cheek halves 144, 146 from experiencing independent relative rotational movement during braking. The rotor cheek edge metallurgical joint 172 may be formed by welding, brazing, or any other technique that is able to metallurgically fuse the first and second rotor cheek halves 144, 146 to each other. Some particularly useful forms of welding include resistance seam welding, arc welding such as gas metal arc welding (GMAW), flux-cored arc welding (GCAW), or gas tungsten arc welding (GTAW), energy beam welding, or solid-state welding such as friction stir welding or induction welding.

In addition to the rotor cheek edge metallurgical joint 172, a first flange metallurgical joint 174 and a second flange metallurgical joint (not shown) fuses and secures the first and second rotor cheek halves 144, 146 to the flange 118. Both of these metallurgical joints are preferably present, as described here, but in some instances only one of those joints may be employed without compromising the attachment of the rotor cheek 114 to the rotor hat 112. The first flange metallurgical joint 174 is situated along the first inner circumferential flange seam 164 and the second flange metallurgical joint (not shown) is situated along the second inner circumferential flange seam (not shown). The first flange metallurgical joint 174 may be uninterrupted around the first inner circumferential flange seam 164 or, alternatively, it may include several intermittent joints spaced circumferentially around the first inner circumferential flange seam 164. The same is true for the second flange metallurgical joint (not shown). One of the main purposes of the first flange metallurgical joint 172 and the second flange metallurgical joint, whether both are present or only one is present, is to adequately secure the rotor cheek halves 144, 146, and thus the rotor cheek 114, to the flange 118 so that the rotor hat 112 and the rotor cheek 114 co-rotate with one another in unison during and between braking events.

Figure 2:
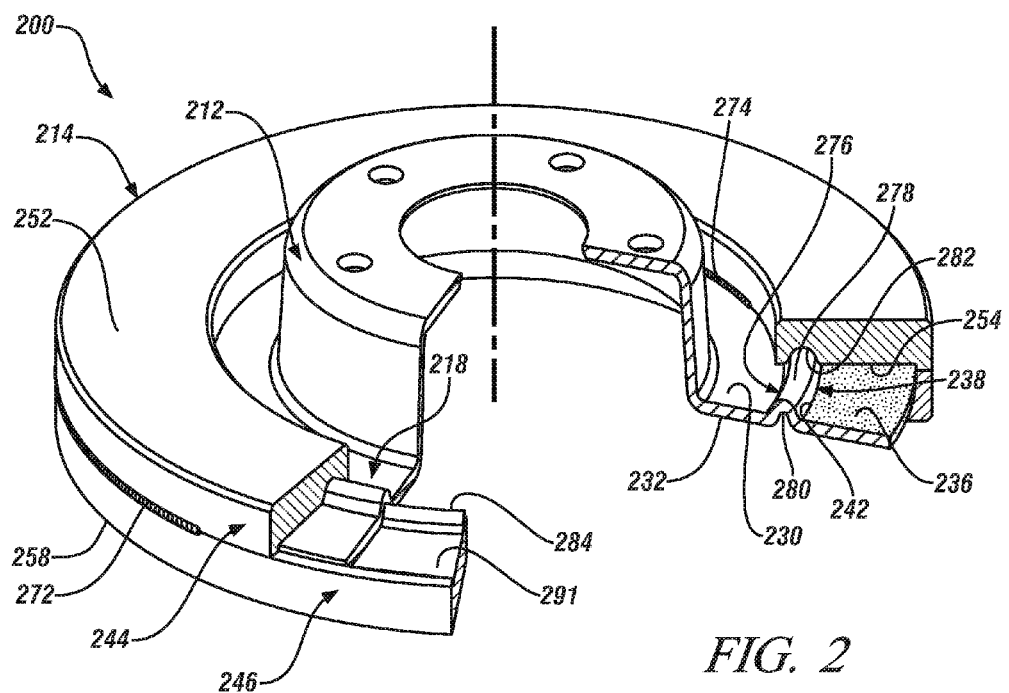
FIG. 2 is a perspective, partially cut-away view of a sound-damped brake rotor according to another embodiment of the invention in which a mechanical fastener is provided to help fixedly secure the rotor cheek to the rotor hat. The mechanical fastener shown in this embodiment is a concentric ridge formed on the flange of the rotor hat.
Figure 3:
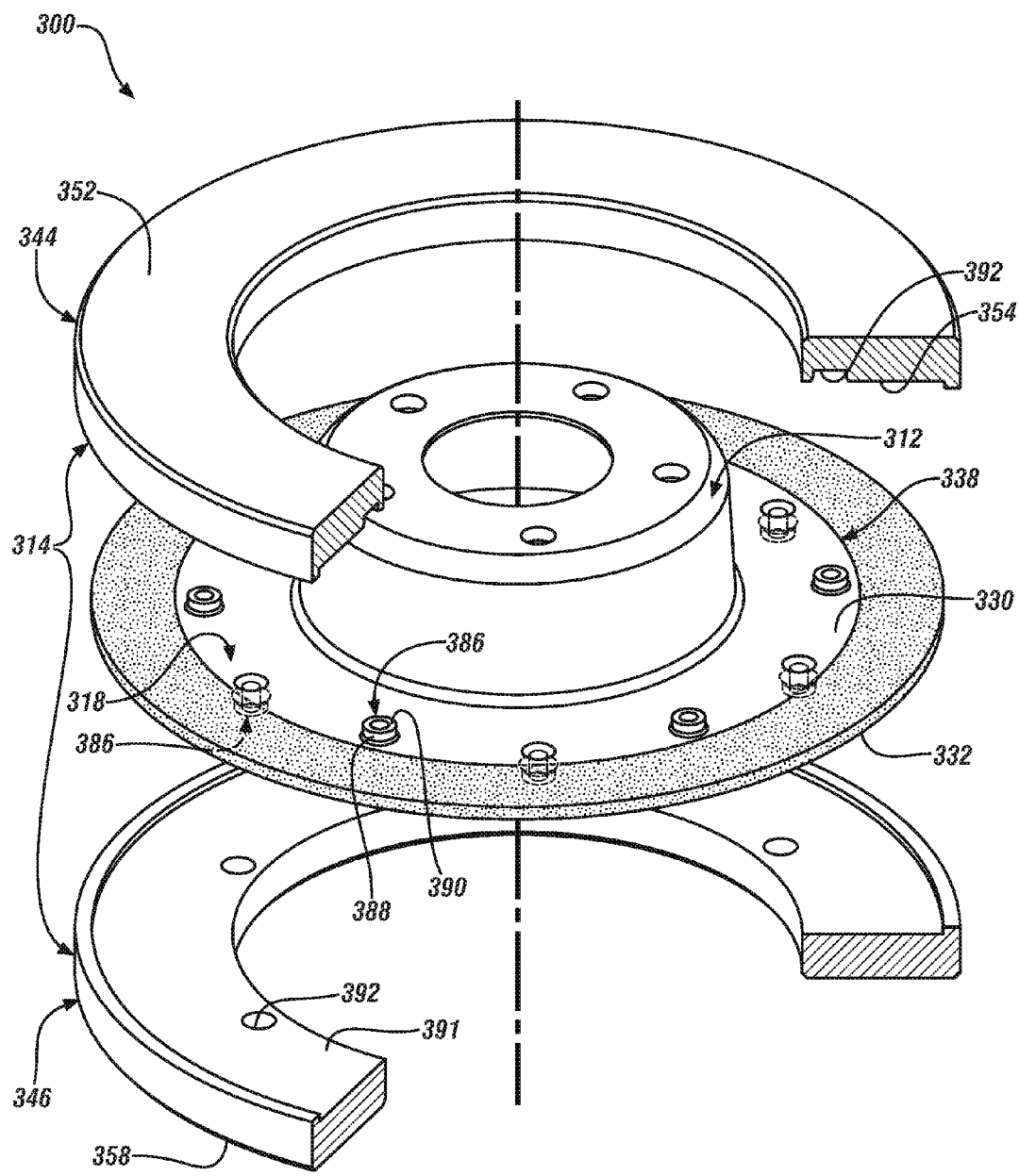
FIG. 3 is a perspective, partially cut-away view of a sound-damped brake rotor according to yet another embodiment of the invention in which a mechanical fastener is provided to help fixedly secure the rotor cheek to the rotor hat. The mechanical fastener shown in this embodiment is a rivet formed on the flange of the rotor hat.

FIGS. 2-3 respectively illustrate a brake rotor 200 and a brake rotor 300 according to other embodiments. Many aspects of these particular brake rotors 200, 300 are the same as those of the previously-described brake rotor 100. Those same aspects are designated by like numerals and their descriptions are not repeated here. Only the structural and functional variations embraced by the brake rotors 200, 300 of these embodiments are discussed. Specifically, the brake rotors 200, 300 shown here include a mechanical fastener on the first or second annular surfaces 230, 330, 232, 332, or both surfaces, of the flange 218, 318. The mechanical fastener supports the rotor cheek 214, 314 on the rotor hat 212, 312 and helps prevent relative independent rotational movement between those two components when the brake pads are pressed against the first and second braking surfaces 252, 352, 258, 358 during braking. The presence of the mechanical fastener may reduce the stress on any of the metallurgical joints employed to help fixedly secure the first and second rotor cheek halves 244, 344, 246, 346 to the flange 218, 318 and, in some instances, may obviate the need for some or all of those metallurgical joints.

The mechanical fastener incorporated into the brake rotor 200 shown in FIG. 2 is a concentric ridge 276 formed on the flange 218. The concentric ridge 276 is both raised above the first annular surface 230 and depressed below the second annular surface 232. As such, the concentric ridge 276 defines a peak 278 on the first annular surface 230 and a trough 280 on the second annular surface 232. The peak 278 and the trough 280 accommodate, respectively, a corresponding channel 282 defined by the underside 254 of the first rotor cheek half 244 and a corresponding protrusion 284 formed on the underside 291 (now shown in FIG. 2) of the second rotor cheek half 246. This engagement of the concentric ridge 276 with the first and second rotor cheek halves 244, 246 promotes resistance to relative independent rotational movement between the rotor hat 212 and the rotor cheek 214. The concentric ridge 276 may be located anywhere on the flange 218 that is covered by at least one of the first or second rotor cheek halves 244, 246. But a preferred location for the concentric ridge 276 is, as shown, radially inwardly adjacent to the inner circumferential border 242 of the peripheral radial segment 238 at which the friction-enhancing coating 236 is present. More than one concentric ridge 276 may be present despite fact that only one is shown in FIG. 2.

The mechanical fastener incorporated into the brake rotor 300 shown in FIG. 3 is a rivet 386 formed on the flange 318. The rivet 386 includes a cylindrical shaft 388 and a head 390 which has a slightly larger diameter than the cylindrical shaft 388. A plurality of the rivets 386 are alternately formed in circumferential spaced relation on the first and second annular surfaces 330, 332, preferably radially inward from the peripheral radial segment 338. To receive the plurality of rivets 386, the underside 354 of the first rotor cheek half 344 and the underside 391 (now shown in FIG. 3) of the second rotor cheek half 346 each includes a plurality of openings 392 that generally correspond in size with the rivets 386. The openings 392 are defined in the undersides 354, 391 of the first and second rotor cheek halves 344, 346 and positioned in circumferential spaced relation to permit diametric alignment with the rivets 386 on the first and second annular surfaces 330, 332 of the flange 318. When aligned, the plurality of rivets 386 on each of the first and second annular surfaces 330, 332 may be press-fit into their respective diametrically opposed openings 392 under an axially compressive force. Such mechanical engagement fixedly secures the first and second rotor cheek halves 344, 346 to the flange 318 to form the rotor cheek 314. It should be noted the metallurgical joints described earlier, although not shown because FIG. 3 is an exploded view, may be retained to help fixedly secure the rotor cheek 314 to the rotor hat 312. These joints may, however, be optionally omitted from the brake rotor 300 if a sufficient number of the rivets 386 are incorporated onto the flange 318.

Figure 4:
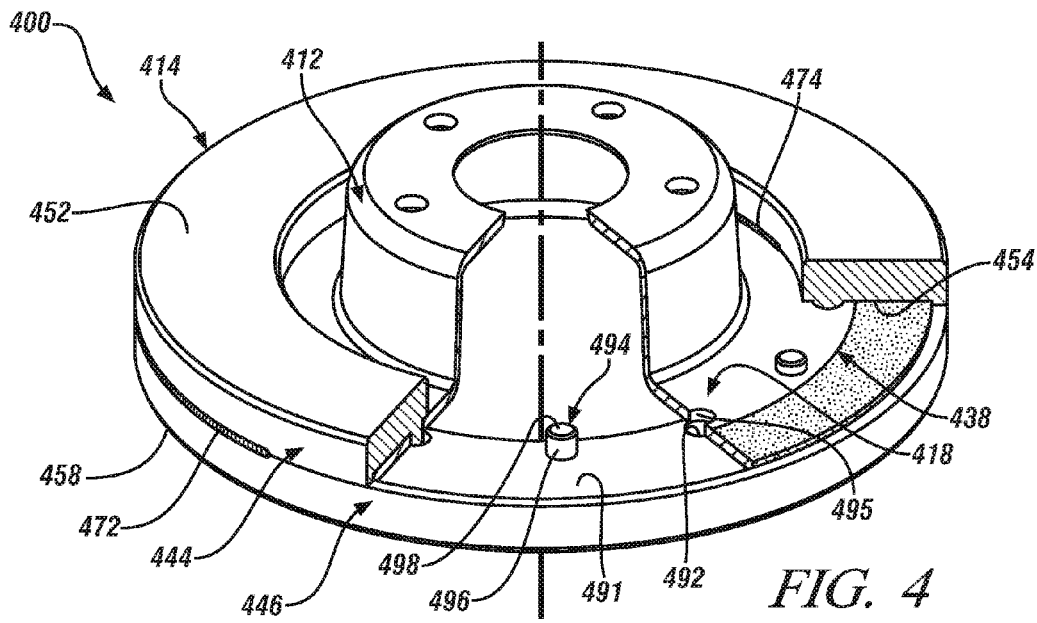
FIG. 4 is a perspective, partially cut-away view of a sound-damped brake rotor according to still another embodiment of the invention in which a mechanical fastener is provided to help fixedly secure the rotor cheek to the rotor hat. The mechanical fastener shown in this embodiment is a rivet formed on the one or more of the pieces that, when assembled, form the rotor cheek.
Figure 5:
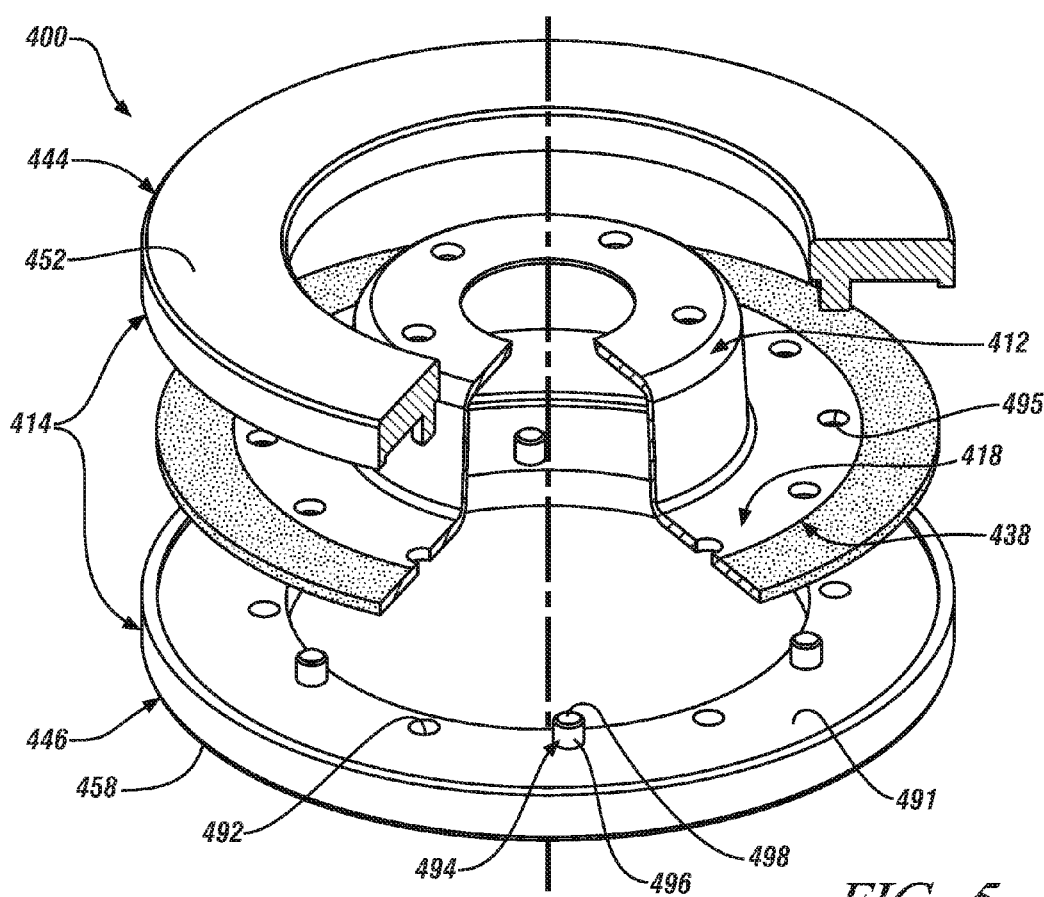
FIG. 5 is an exploded view of the sound-damped brake rotor shown in FIG. 4.

FIGS. 4-5 illustrate a brake rotor 400 according to yet another embodiment. Many aspects of this particular brake rotor 400 are the same as those of the first-described brake rotor 100. Those same aspects are designated by like numerals and their descriptions are not repeated here. Only the structural and functional variations embraced by the brake rotor 400 of this embodiment are discussed. Specifically, the brake rotor 400 shown here includes a mechanical fastener extending from the underside 454 of the first rotor cheek half 444, the underside 491 (now shown in FIGS. 4-5) of the second rotor cheek half 446, or both. The mechanical fastener supports the rotor cheek 414 on the rotor hat 412 and helps prevent relative independent rotational movement between those two components when the brake pads are pressed against the first and second braking surfaces 452, 458 during braking. The presence of the mechanical fastener may reduce the stress on the metallurgical joints employed to fixedly secure the first and second rotor cheek halves 144, 146 to the flange 118 of the rotor hat 112 in the first described embodiment and, in some instances, may obviate the need for some or all of those metallurgical joints.

The mechanical fastener incorporated into the brake rotor 400 shown in FIGS. 4-5 is a rivet 494 that includes, similar to the rivet 386 just described, a cylindrical shaft 496 and a head 498 which has a slightly larger diameter than the cylindrical shaft 496. A plurality of the rivets 494 are formed in circumferential spaced relation along the underside 454 of the first rotor cheek half 444 and the underside 491 of the second rotor cheek half 446. The underside 454 of the first rotor cheek half 444 and the underside 491 of the second rotor cheek half 446, moreover, each define a plurality of openings 492 that generally correspond in size with the rivets 494. The plurality of openings 492 are alternately positioned between the rivets 494 on the undersides 454, 491 of the first and second rotor cheek halves 444, 446. This arrangement of the rivets 494 and the openings 492 permits the rivets 494 on one rotor cheek half 444, 446 to be aligned with and received by the openings 492 on the other rotor cheek half 444, 446.

The flange 418 includes a plurality of holes 495 though which the rivets 494 from both the first and second rotor cheek halves 444, 446 can traverse the thickness of the flange 418.

These holes 495 can be aligned with the rivets 494 from each rotor cheek half 444, 446 and are preferably located radially inward from the peripheral radial segment 438. When aligned, the plurality of rivets 494 extending from the undersides 454, 491 of the first and second rotor cheek halves 444, 446 may be passed through the plurality of holes 495 in the flange 418 and press-fit, under an axially compressive force, into their respective diametrically opposed openings 492 defined in the other of the first and second rotor cheek halves 444, 446. Such mechanical engagement fixedly secures the first and second rotor cheek halves 444, 446 to the flange 418 to form the rotor cheek 414. It should be noted, as shown in FIG. 4, at least one of the rotor cheek edge metallurgical joint 472, the first flange metallurgical joint 474, or the second flange metallurgical joint (not shown) may be retained to help fixedly secure the rotor cheek 414 to the rotor hat 412. These joints may, however, be optionally omitted from the brake rotor 400 if a sufficient number of the rivets 494 are incorporated into the first and second rotor cheek halves 444, 446.

Figure 6:
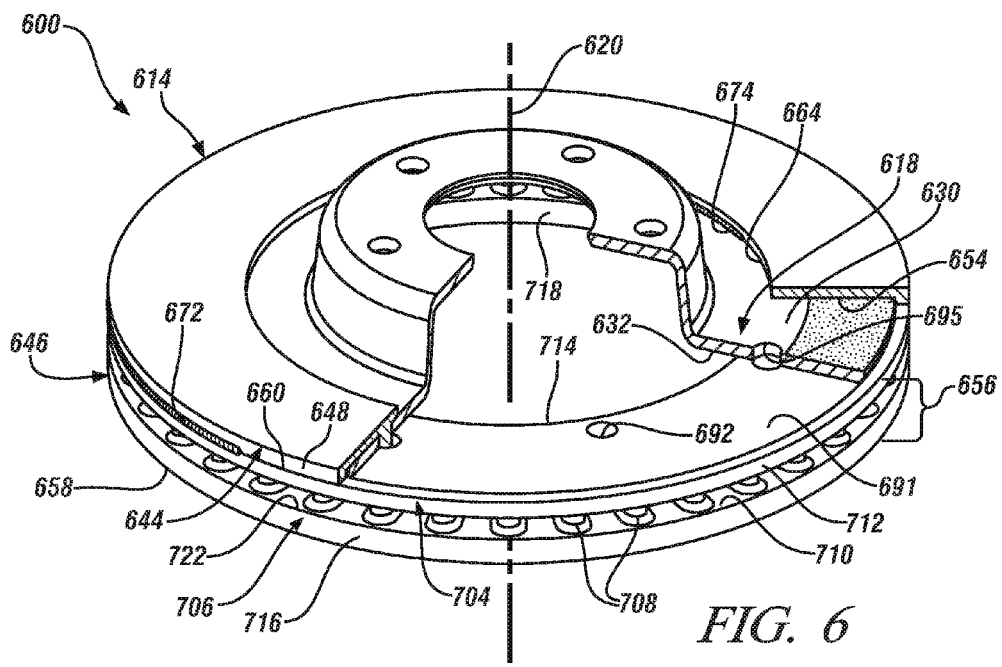
FIG. 6 is a perspective, partially cut-away view of a sound-damped brake rotor according to still another embodiment of the invention in which the rotor cheek is vented.
Figure 7:
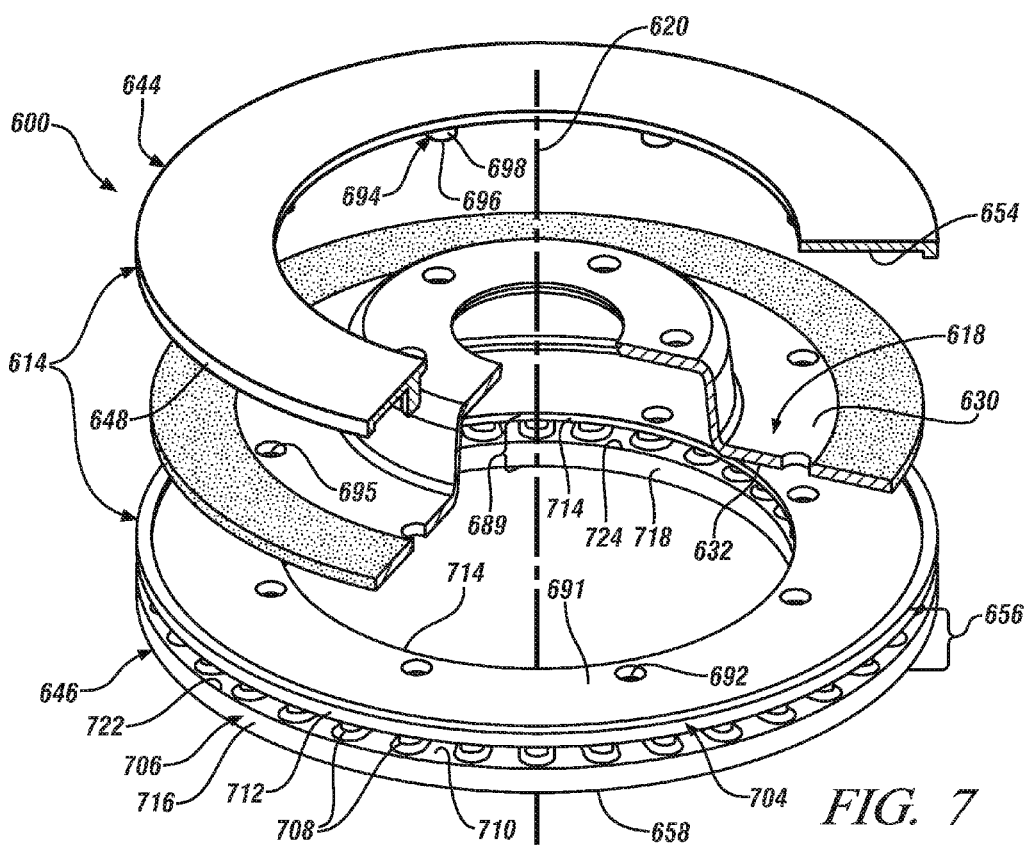
FIG. 7 is an exploded view of the sound-damped brake rotor shown in FIG. 6.

FIGS. 6-7 illustrate a brake rotor 600 according to yet another embodiment. Many aspects of this particular brake rotor 600 are the same as those of the first-described brake rotor 100. Those same aspects are designated by like numerals and their descriptions are not repeated here. Only the structural and functional variations embraced by the brake rotor 600 of this embodiment are discussed. Specifically, the second rotor cheek half 646 of the brake rotor 600 shown here is vented. The vented nature of the second rotor cheek half 646 gives the rotor cheek 614 enhanced heat dissipation capabilities by permitting the centrifugal expulsion of heated air during braking. It should be understood that the brake rotor 600 could include two vented rotor cheek halves—one on each side of the flange 618—despite what is explicitly shown in FIGS. 6-7.

The second rotor cheek half 646 of this embodiment is thicker than the first rotor cheek half 644 along the longitudinal axis 620 of the brake rotor 600. The second rotor cheek half 646 includes a first annular plate 704 and a second annular plate 706 axially-displaced from the first annular plate 704. Situated between the first and second annular plates 704, 706 are a plurality of internal partitions 708 that define a plurality of radially extending vanes 710. The first annular plate 704 includes a first outer plate circumferential edge 712 and a first inner plate circumferential edge 714. The second annular plate 706 similarly includes a second outer plate circumferential edge 716 and a second inner plate circumferential edge 718. The first and second outer plate circumferential edges 712, 716 establish the second outer circumferential edge 656 of the second rotor cheek half 646 similar to the previously described embodiments. The first and second inner plate circumferential edges 714, 718 establish the second inner circumferential edge 689 (now shown in FIG. 7) in like fashion. The underside 691 (now shown in FIGS. 6-7) of the second rotor cheek half 646 extends from the first outer plate circumferential edge 712 to the first inner plate circumferential edge 714 on the side of the first annular plate 704 opposite the partitions 708. In much the same way, the second braking surface 658 of the second rotor cheek half 646 extends from the second outer plate circumferential edge 716 to the second inner plate circumferential edge 718 on the side of the second annular plate 706 opposite the partitions 708.

The internal partitions 708 are circumferentially spaced around the second rotor cheek half 646 between the first and second annular plates 704, 706. An outer circumferential vane access channel 722 which separates the first and second outer plate circumferential edges 712, 716 opens the vanes 710 to the external atmosphere at the second outer circumferential edge 656. The partitions 708 may be straight or curved and, as shown, direct the vanes 710 radially inwardly from the outer circumferential vane access channel 722 all the way through the second rotor cheek half 646 such that an inner circumferential vane access channel 724 which separates the first and second inner plate circumferential edges 714, 718 is also present. The vanes 710, however, are not required to extend radially through the second rotor cheek half 646 in such a manner. One notable impact the vanes 710 have on the functionality of the second rotor cheek half 646 is the potential for air flow cooling. Any air contained in the vanes 710 during rotation of the brake rotor 600, for instance, is centrifugally expelled through the outer circumferential vane access channel 722. This helps dissipate the heat generated at the second braking surface 658 during braking.

The second rotor cheek half 646 and the first rotor cheek half 644 are fixedly secured to the flange 618 of the rotor hat 612 by at least one of the rotor cheek edge metallurgical joint 672, the first flange metallurgical joint 674, the second flange metallurgical joint (not shown), and/or a mechanical fastener. The rotor cheek edge metallurgical joint 672, much like the brake rotor 100 of the first disclosed embodiment, fuses and secures the first rotor cheek half 644 and the second rotor cheek half 646 together and is situated along the circumferential edge seam 660 formed by the abutment of the first outer circumferential edge 648 and the second outer circumferential edge 656; that is, more specifically in this embodiment, at the abutment of the first outer circumferential edge 648 and the first outer plate circumferential edge 712. The first flange metallurgical joint 674 is situated along the first inner circumferential flange seam 664. The second flange metallurgical joint (not shown) is situated along the second inner circumferential flange seam (not shown) which, in this embodiment, is formed between the second inner circumferential edge 689, more specifically the first inner plate circumferential edge 714, and the second annular surface 632. Both the first flange metallurgical joint 672 and the second flange metallurgical joint fuse and secure the first rotor cheek half 644 and the second rotor cheek half 646 to their respective annular surfaces 630, 632 of the flange 618.

The mechanical fastener shown here is a rivet 694 that includes, similar to the rivet 494 described in the fourth disclosed embodiment, a cylindrical shaft 696 and a head 698 which has a slightly larger diameter than the cylindrical shaft 696. A plurality of the rivets 694 are formed in circumferential spaced relation along the underside 654 of the first rotor cheek half 644 while a plurality of openings 692 that correspond generally in size with the rivets 694 are defined in the underside 691 of the second rotor cheek half 646. The flange 618 includes a plurality of holes 695 though which the rivets 694 from the first rotor cheek half 644 can traverse the thickness of the flange 618 and be received by the openings 692 in the second rotor cheek half 646. When aligned, the plurality of rivets 694 extending from the underside 654 of the first rotor cheek half 644 are passed through the plurality of holes 695 in the flange 618 and press-fit, under an axially compressive force, into their respective diametrically opposed openings 692 defined in the underside 691 of the second rotor cheek half 646. Such mechanical engagement helps fixedly secure the first rotor cheek half 644 and the second rotor cheek half 646 to the flange 618 to form the rotor cheek 614.

Figure 8:
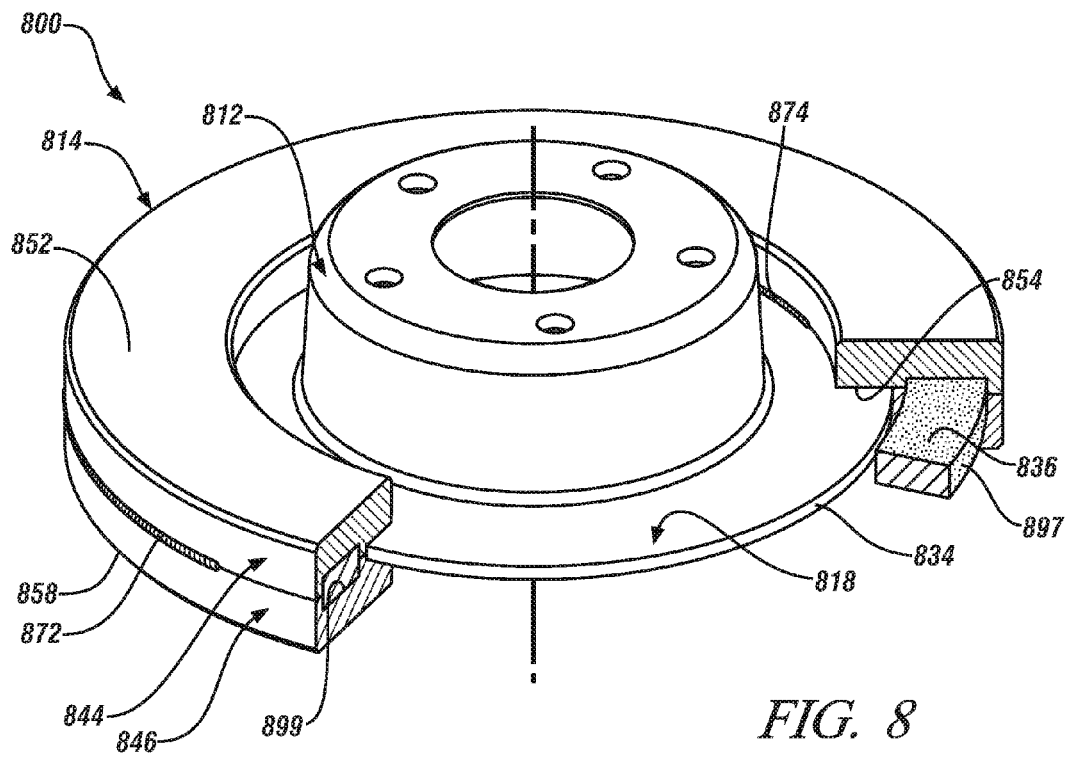
FIG. 8 is a perspective, partially cut-away view of a sound-damped brake rotor according to yet another embodiment of the invention in which metallurgical joints are provided to help fixedly secure the rotor cheek to the rotor hat. The vibration damping element employed in this embodiment differs from the vibration damping element employed in the embodiment shown in FIG. 1.

FIG. 8 illustrates a brake rotor 800 according to yet another embodiment. Many aspects of this particular brake rotor 800 are the same as those of the first-described brake rotor 100. Those same aspects are designated by like numerals and their descriptions are not repeated here. Only the structural and functional variations embraced by the brake rotor 800 of this embodiment are discussed. Specifically, the brake rotor 800 shown here includes an annular band 897 which is independent from both the rotor hat 812 and the rotor cheek 814. The annular band 897 is confined in a correspondingly-shaped retention feature 899 defined by both the first and second rotor cheek halves 844, 846 and situated radially outwardly from the edge surface 834 of the flange 818. The retention feature 899, as shown, is preferably an enclosed, annular channel defined jointly by the underside 854 of the first rotor cheek half 844 and the underside (not shown) of the second rotor cheek half 846. The first and second rotor cheek halves 844, 846 are fixedly secured to the flange 818 by at least one of the rotor cheek edge metallurgical joint 872, the first flange metallurgical joint 874, or the second flange metallurgical joint (not shown), as described above for the brake rotor 100 of the first disclosed embodiment.

The annular band 897 and the retention feature 899 may embody any suitable cross-sectional shape such as rectangular (as shown), circular, triangular, hexagonular, or octagonular, to name but a few. A physically distinct and independent surface-to-surface contacting relationship exists between the annular band 897 and the retention feature 899 formed in the rotor cheek 814. Relative frictional contacting movement is therefore able to transpire between the annular band 897 and the underside 854 of the first rotor cheek half 844 and the underside (not shown) of the second rotor cheek half 846 when the brake pads engage the first and second braking surfaces 852, 858 and impart vibrations to the brake rotor 800. Such relative interfacial frictional movement converts mechanical vibratory energy into thermal energy which, in turn, disrupts vibration propagation and substantially lessens any associated noise transmission. The annular band 897 is optionally coated with the friction-enhancing coating 836 to affect the frictional interaction at the interface of the annular band 897 and the rotor cheek 814. The friction-enhancing coating 836 is optional here because the annular band 897 is separate and independent from the flange 818 and, thus, can experience its own relative frictional contacting movement with the rotor cheek 814.

Figure 9:
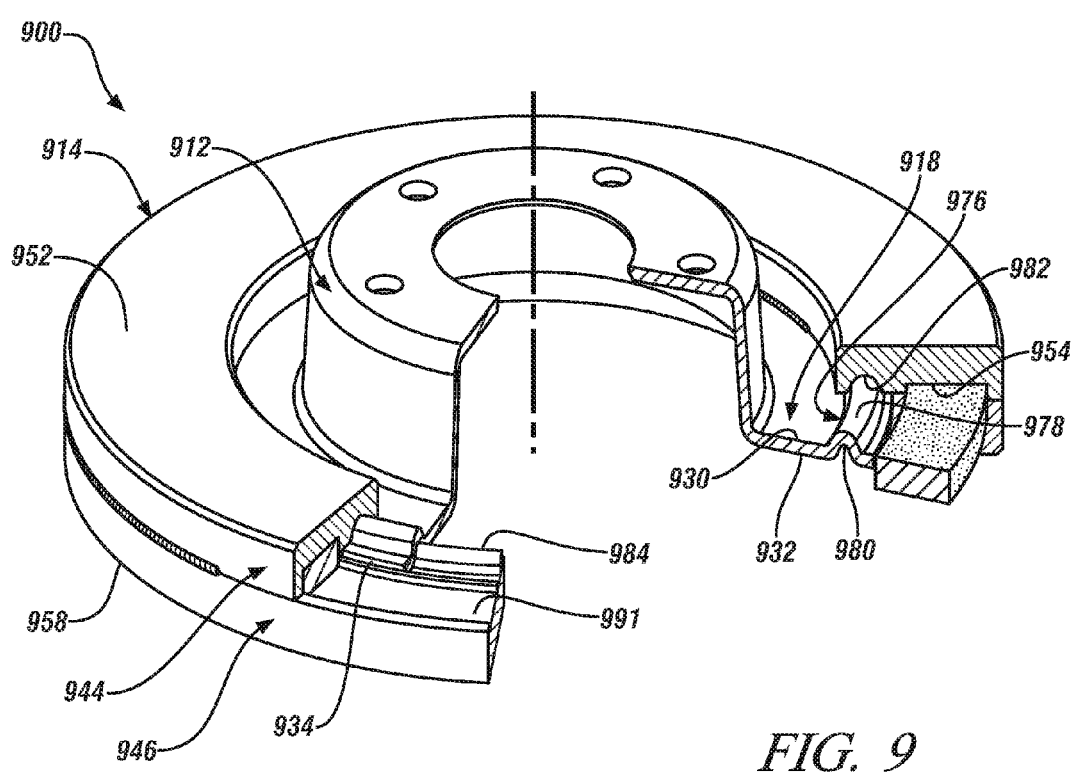
FIG. 9 is a perspective, partially cut-away view of a sound-damped brake rotor according to still another embodiment of the invention in which a mechanical fastener is provided to help fixedly secure the rotor cheek to the rotor hat. The vibration damping element employed in this embodiment differs from the vibration damping element employed in the embodiment shown in FIG. 2.

FIG. 9 illustrates a brake rotor 900 according to yet another embodiment. Many aspects of this particular brake rotor 900 are the same as those of the sixth-described brake rotor 800. Those same aspects are designated by like numerals and their descriptions are not repeated here. Only the structural and functional variations embraced by the brake rotor 900 of this embodiment are discussed. Specifically, the brake rotor 900 shown here includes a mechanical fastener similar to the one shown and described in the brake rotor 200 of the second disclosed embodiment. The mechanical fastener supports the rotor cheek 914 on the rotor hat 912 and helps prevent relative independent rotational movement between those two components when the brake pads are pressed against the first and second braking surfaces 952, 958 during braking. The presence of the mechanical fastener may reduce the stress on any of the metallurgical joints employed to help fixedly secure the first and second rotor cheek halves 944, 946 to the flange 918 of the rotor hat 912 and, in some instances, may obviate the need for some or all of those metallurgical joints.

The mechanical fastener incorporated into the brake rotor 900 shown in FIG. 9 is a concentric ridge 976 formed on the flange 918. The concentric ridge 976 is both raised above the first annular surface 930 and depressed below the second annular surface 932. As such, the concentric ridge 976 defines a peak 978 on the first annular surface 930 and a trough 980 on the second annular surface 932. The peak 978 and the trough 980 accommodate, respectively, a corresponding channel 982 defined by the underside 954 of the first rotor cheek half 944 and a corresponding protrusion 984 formed in the underside 991 (now shown in FIG. 9) of the second rotor cheek half 946. This engagement of the concentric ridge 976 with the first and second rotor cheek halves 944, 946 promotes resistance to relative independent rotational movement between the rotor hat 912 and the rotor cheek 914. The concentric ridge 976 may be located anywhere on the flange 918 that is covered by at least one of the first or second rotor cheek halves 944, 946. But a preferred location for the concentric ridge 976 is, as shown, radially inwardly adjacent to the edge surface 934 of the flange 918. More than one concentric ridge 976 may be present despite fact that only one is shown in FIG. 9.

Figure 10:
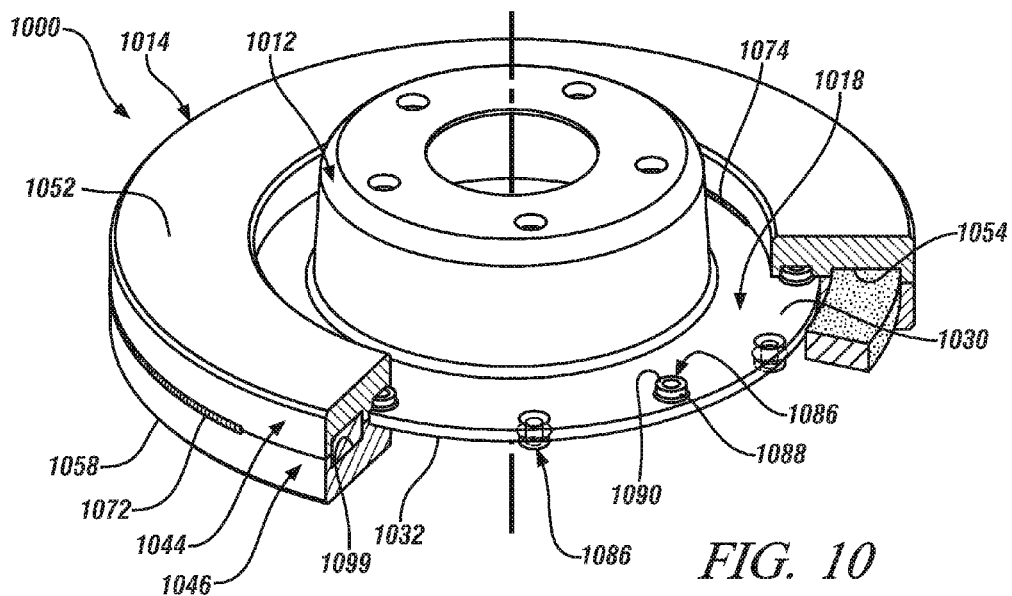
FIG. 10 is a perspective, partially cut-away view of a sound-damped brake rotor according to yet another embodiment of the invention in which a mechanical fastener is provided to help fixedly secure the rotor cheek to the rotor hat. The vibration damping element employed in this embodiment differs from the vibration damping element employed in the embodiment shown in FIG. 3.
Figure 11:
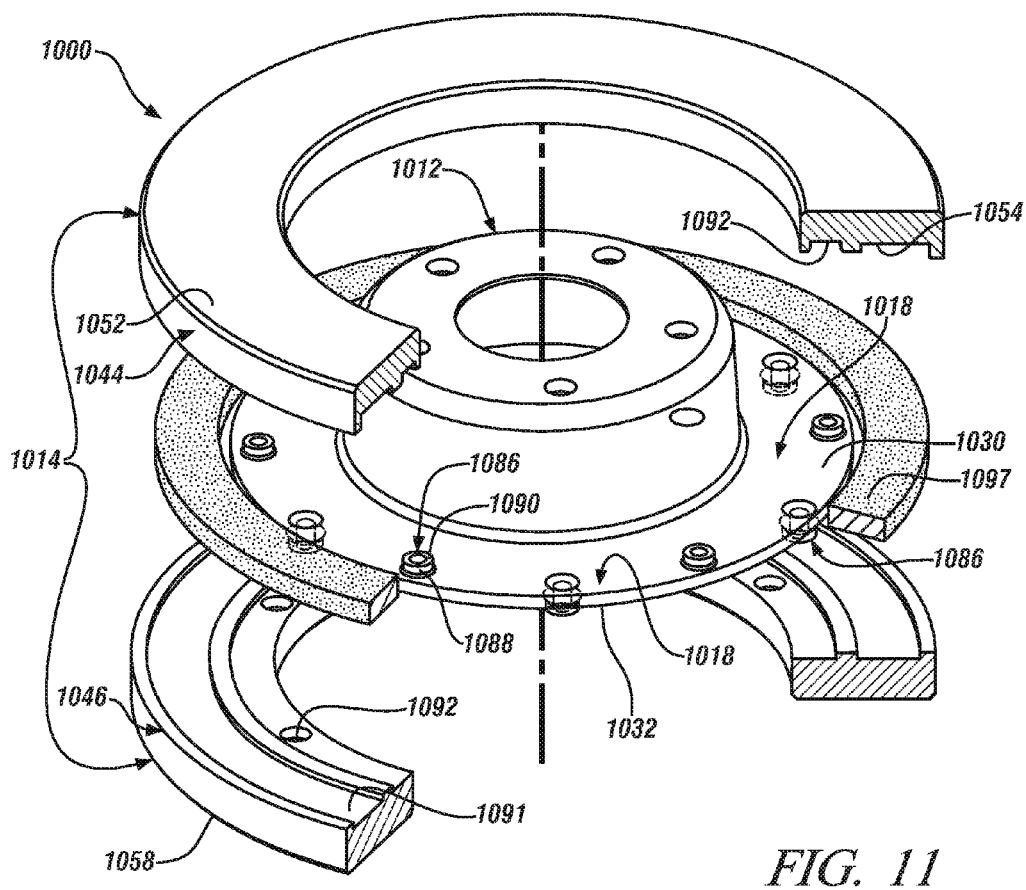
FIG. 11 is an exploded view of the sound-damped brake rotor shown in FIG. 10.

FIGS. 10-11 illustrate a brake rotor 1000 according to yet another embodiment. Many aspects of this particular brake rotor 1000 are the same as those of the sixth-described brake rotor 800. Those same aspects are designated by like numerals and their descriptions are not repeated here. Only the structural and functional variations embraced by the brake rotor 1000 of this embodiment are discussed. Specifically, the brake rotor 1000 shown here includes a mechanical fastener similar to the one shown and described in the brake rotor 300 of the third disclosed embodiment. The mechanical fastener supports the rotor cheek 1014 on the rotor hat 1012 and helps prevent relative independent rotational movement between those two components when the brake pads are pressed against the first and second braking surfaces 1052, 1058 during braking. The presence of the mechanical fastener may reduce the stress on any of the metallurgical joints (shown only in FIG. 10) employed to help fixedly secure the first and second rotor cheek halves 1044, 1046 to the flange 1018 and, in some instances, may obviate the need for some or all of those metallurgical joints.

The mechanical fastener incorporated into the brake rotor 1000 shown in FIGS. 10-11 is a rivet 1086 formed on the flange 1018. The rivet 1086 includes a cylindrical shaft 1088 and a head 1090 which has a slightly larger diameter than the cylindrical shaft 1088. A plurality of the rivets 1086 are alternately formed in circumferential spaced relation on the first and second annular surfaces 1030, 1032. To receive the plurality of rivets 1086, the underside 1054 of the first rotor cheek half 1044 and the underside 1091 (now shown in FIG. 11) of the second rotor cheek half 1046 each includes a plurality of openings 1092 that generally correspond in size with the rivets 1086. The openings 1092 are defined in the undersides 1054, 1091 of the first and second rotor cheek halves 1044, 1046 and positioned in circumferential spaced relation to permit diametric alignment with the rivets 1086 on the first and second annular surfaces 1030, 1032 of the flange 1018. When aligned, the plurality of rivets 1086 on each of the first and second annular surfaces 1030, 1032 may be press-fit into their respective diametrically opposed openings 1092 under an axially compressive force. Such mechanical engagement fixedly secures the first and second rotor cheek halves 1044, 1046 to the flange 1018, with the annular band 1097 confined within the retention feature 1099, to form the rotor cheek 1014. It should be noted at least one, and possible all, of the rotor cheek edge metallurgical joint 1072, the first flange metallurgical joint 1074, or the second flange metallurgical joint (not shown) may, optionally, be omitted from the brake rotor 1000 if a sufficient number of rivets 1086 are incorporated onto the flange 1018.

Figure 12:
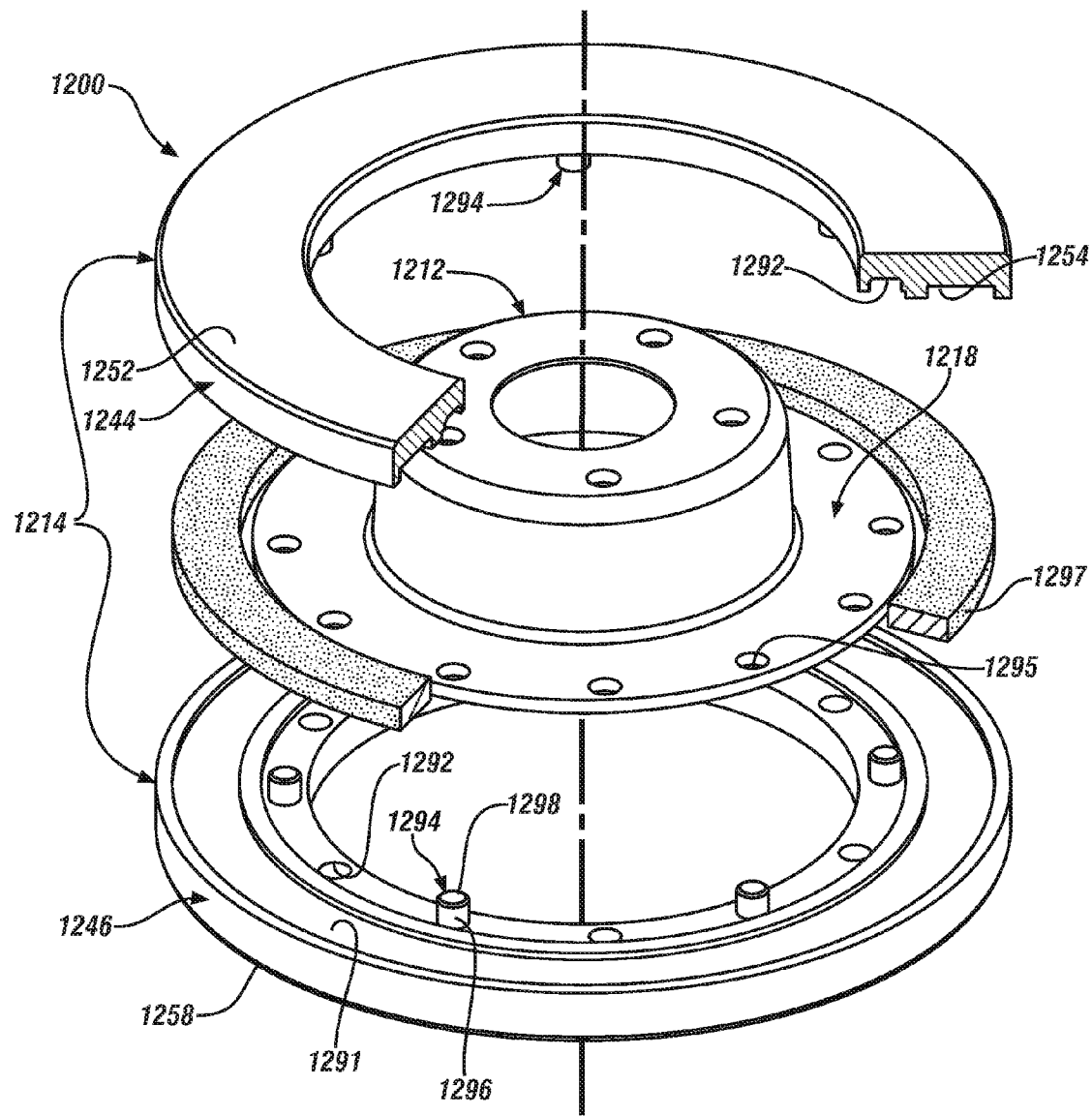
FIG. 12 is a perspective, partially cut-away view of a sound-damped brake rotor according to still another embodiment of the invention in which a mechanical fastener is provided to help fixedly secure the rotor cheek to the rotor hat. The vibration damping element employed in this embodiment differs from the vibration damping element employed in the embodiment shown in FIGS. 4-5.

FIG. 12 illustrates a brake rotor 1200 according to yet another embodiment. Many aspects of this particular brake rotor 1200 are the same as those of the sixth-described brake rotor 800. Those same aspects are designated by like numerals and are their descriptions are not repeated here. Only the structural and functional variations embraced by the brake rotor 1200 of this embodiment are discussed. Specifically, the brake rotor 1200 shown here includes a mechanical fastener extending from the underside 1254 of the first rotor cheek half 1244, the underside 1291 of the second rotor cheek half 1246, or both, similar to the brake rotor 400 shown in the fourth disclosed embodiment (FIGS. 4-5). The mechanical fastener supports the rotor cheek 1214 on the rotor hat 1212 and helps prevent relative independent rotational movement between those two components when the brake pads are pressed against the first and second braking surfaces 1252, 1258 during braking. The presence of the mechanical fastener may reduce the stress on any of the metallurgical joints (not shown because FIG. 12 is an exploded view) employed to help fixedly secure the first and second rotor cheek halves 1244, 1246 to the flange 1218 of the rotor hat 1212 in the sixth-described brake rotor 800 and, in some instances, may obviate the need for some or all of those metallurgical joints.

The mechanical fastener incorporated into the brake rotor 1200 shown in FIG. 12 is a rivet 1294 that includes a cylindrical shaft 1296 and a head 1298 which has a slightly larger diameter than the cylindrical shaft 1296. A plurality of the rivets 1294 are formed in circumferential spaced relation along the underside 1254 of the first rotor cheek half 1244 and the underside 1291 (now shown in FIG. 12) of the second rotor cheek half 1246. The underside 1254 of the first rotor cheek half 1244 and the underside 1291 of the second rotor cheek half 1246, moreover, each define a plurality of openings 1292 that generally correspond in size with the rivets 1294. The plurality of openings 1292 are alternately formed between the rivets 1294 on the undersides 1254, 1291 of the first and second rotor cheek halves 1244, 1246. This arrangement of rivets 1294 and openings 1292 permits the rivets 1294 on one rotor cheek half 1244, 1246 to be aligned with and received by the openings 1292 on the other rotor cheek half 1244, 1246.

The flange 1218 includes a plurality of holes 1295 though which the rivets 1294 from both the first and second rotor cheek halves 1244, 1246 can traverse the thickness of the flange 1218. These holes 1295 can be aligned with the rivets 1294 from each rotor cheek half 1244, 1246. When aligned, the plurality of rivets 1294 extending from the undersides 1254, 1291 of the first and second rotor cheek halves 1244, 1246 may be passed through the plurality of holes 1295 in the flange 1218 and press-fit, under an axially compressive force, into their respective diametrically opposed openings 1292 defined in the other of the first and second rotor cheek halves 1244, 1246. Such mechanical engagement fixedly secures the first and second rotor cheek halves 1244, 1246 to the flange 1218 to form the rotor cheek 1214 around the annular band 1297. At least one, and possible all, of the various metallurgical joints included in the brake rotor 800 of the sixth described embodiment may optionally be omitted from the brake rotor 1200 if a sufficient number of rivets 1294 are incorporated into the first and second rotor cheek halves 1244, 1246.

Figure 13:
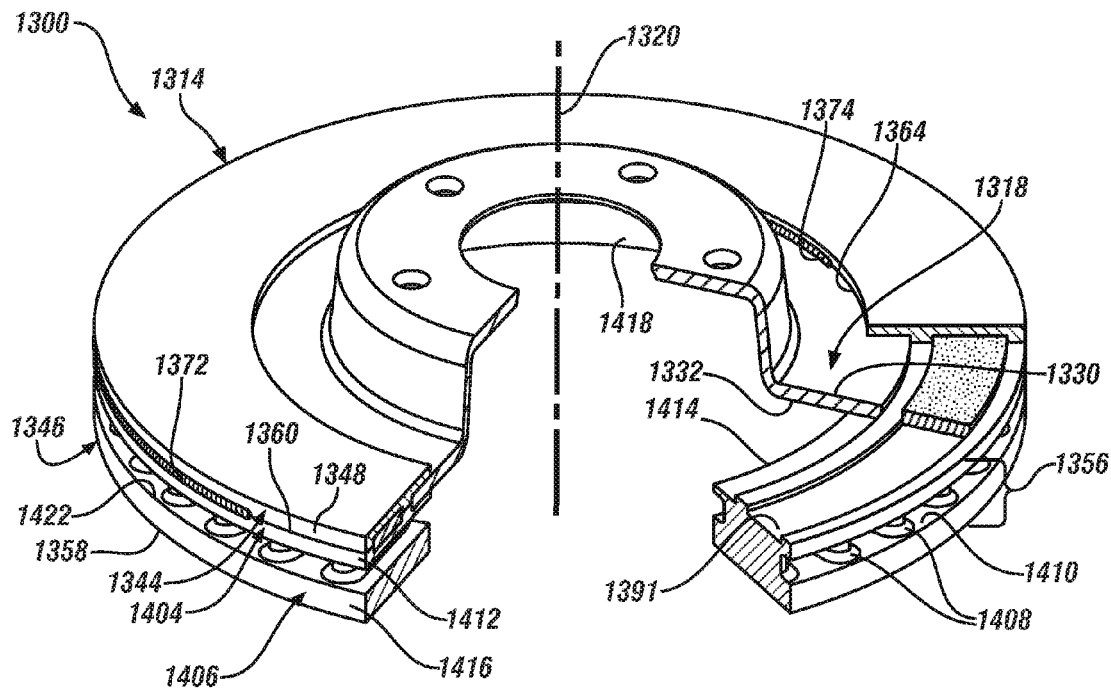
FIG. 13 is a perspective, partially cut-away view of a sound-damped brake rotor according to still another embodiment of the invention in which the rotor cheek is vented. The vibration damping element employed in this embodiment differs from the vibration damping element employed in the embodiment shown in FIGS. 6-7.

FIG. 13 illustrates a brake rotor 1300 according to still another embodiment. Many aspects of this particular brake rotor 1300 are the same as those of the sixth-described brake rotor 800. Those same aspects are designated by like numerals and their descriptions are not repeated here. Only the structural and functional variations embraced by the brake rotor 1300 of this embodiment are discussed. Specifically, the second rotor cheek half 1346 of the brake rotor 1300 shown here is vented similar to the one shown and described in the brake rotor 600 of the fifth disclosed embodiment (FIGS. 6-7). The second rotor cheek half 1346 gives the rotor cheek 1314 enhanced heat dissipation capabilities by permitting the centrifugal expulsion of heated air during braking. It should be understood that the brake rotor 1300 could, like before, include two vented rotor cheek halves—one on each side of the flange 1318—despite what is explicitly shown in FIG. 13.

The second rotor cheek half 1346 of this embodiment is thicker than the first rotor cheek half 1344 along the longitudinal axis 1320 of the brake rotor 1300. The second rotor cheek half 1346 includes a first annular plate 1404 and a second annular plate 1406 axially-displaced from the first annular plate 1404. Situated between the first and second annular plates 1404, 1406 are a plurality of internal partitions 1408 that define a plurality of radially extending vanes 1410. The first annular plate 1404 includes a first outer plate circumferential edge 1412 and a first inner plate circumferential edge 1414. The second annular plate 1406 similarly includes a second outer plate circumferential edge 1416 and a second inner plate circumferential edge 1418. The first and second outer plate circumferential edges 1412, 1416 establish the second outer circumferential edge 1356 of the second rotor cheek half 1346 similar to the fifth disclosed embodiment. The first and second inner plate circumferential edges 1414, 1418 establish the second inner circumferential edge (not shown) in like fashion. The underside 1391 (now shown in FIG. 13) of the second rotor cheek half 1346 extends from the first outer plate circumferential edge 1412 to the first inner plate circumferential edge 1414 on the side of the first annular plate 1404 opposite the partitions 1408. In much the same manner, the second braking surface 1358 of the second rotor cheek half 1346 extends from the second outer plate circumferential edge 1416 to the second inner plate circumferential edge 1418 on the side of the second annular plate 1406 opposite the partitions 1408.

The internal partitions 1408 are circumferentially spaced around the second rotor cheek half 1346 between the first and second annular plates 1404, 1406. An outer circumferential vane access channel 1422 which separates the first and second outer plate circumferential edges 1412, 1416 opens the vanes 1410 to the external atmosphere at the second outer circumferential edge 1356. The partitions 1408 may be straight or curved and, as shown, direct the vanes 1410 radially inwardly from the outer circumferential vane access channel 1422 all the way through the second rotor cheek half 1346 such that an inner circumferential vane access channel (not shown) which separates the first and second inner plate circumferential edges 1414, 1418 is also present. The vanes 1410, however, are not required to extend radially through the second rotor cheek half 1346 in such a manner. One notable impact the vanes 1410 have on the functionality of the second rotor cheek half 1346 is the potential for air flow cooling. Any air contained in the vanes 1410 during rotation of the brake rotor 1300, for instance, is centrifugally expelled through the outer circumferential vane access channel 1422. This helps dissipate the heat generated at the second braking surfaces 1358 during braking.

The second rotor cheek half 1346 and the first rotor cheek half 1344 are fixedly secured to the flange 1318 of the rotor hat 1312 by at least one of the rotor cheek edge metallurgical joint 1372, the first flange metallurgical joint 1374, or the second flange metallurgical joint (not shown). The rotor cheek edge metallurgical joint 1372, much like the brake rotor 100 of the first disclosed embodiment, fuses and secures the first rotor cheek half 1344 and second rotor cheek half 1346 together and is situated along the circumferential edge seam 1360 formed by the abutment of the first outer circumferential edge 1348 and the second outer circumferential edge 1356; that is, more specifically in this embodiment, at the abutment of the first outer circumferential edge 1348 and the first outer plate circumferential edge 1412. The first flange metallurgical joint 1374 is situated along the first inner circumferential flange seam 1364. The second flange metallurgical joint (not shown) is situated along the second inner circumferential flange seam (not shown) which, in this embodiment, is formed between the second inner circumferential edge (not shown), more specifically the first inner plate circumferential edge 1414, and the second annular surface 1332. Both the first flange metallurgical joint 1374 and the second flange metallurgical joint fuse and secure the first rotor cheek half 1344 and the second rotor cheek half 1346 to their respective annular surfaces 1330, 1332 of the flange 1318. The same mechanical fasteners described in the brake rotors 900, 1000, 1200 shown in FIGS. 9-12 may also be employed to help fixedly secure the rotor cheek 1314 to the rotor hat 1312 even though they are not specifically illustrated here.

Figure 14:
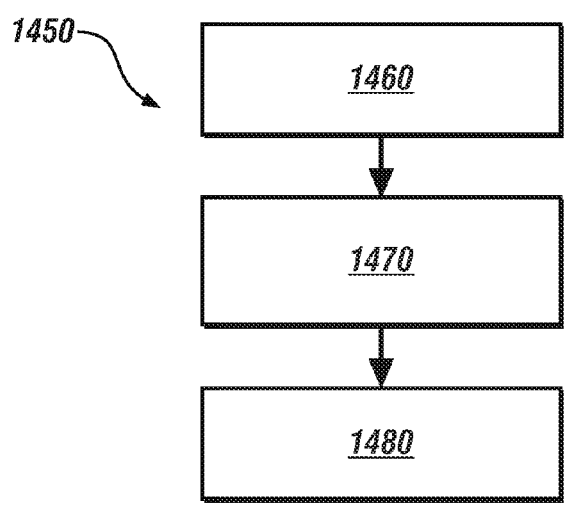
FIG. 14 is a schematic illustration of a method for manufacturing any of the brake rotors shown in FIGS. 1-13.
Figure 15:
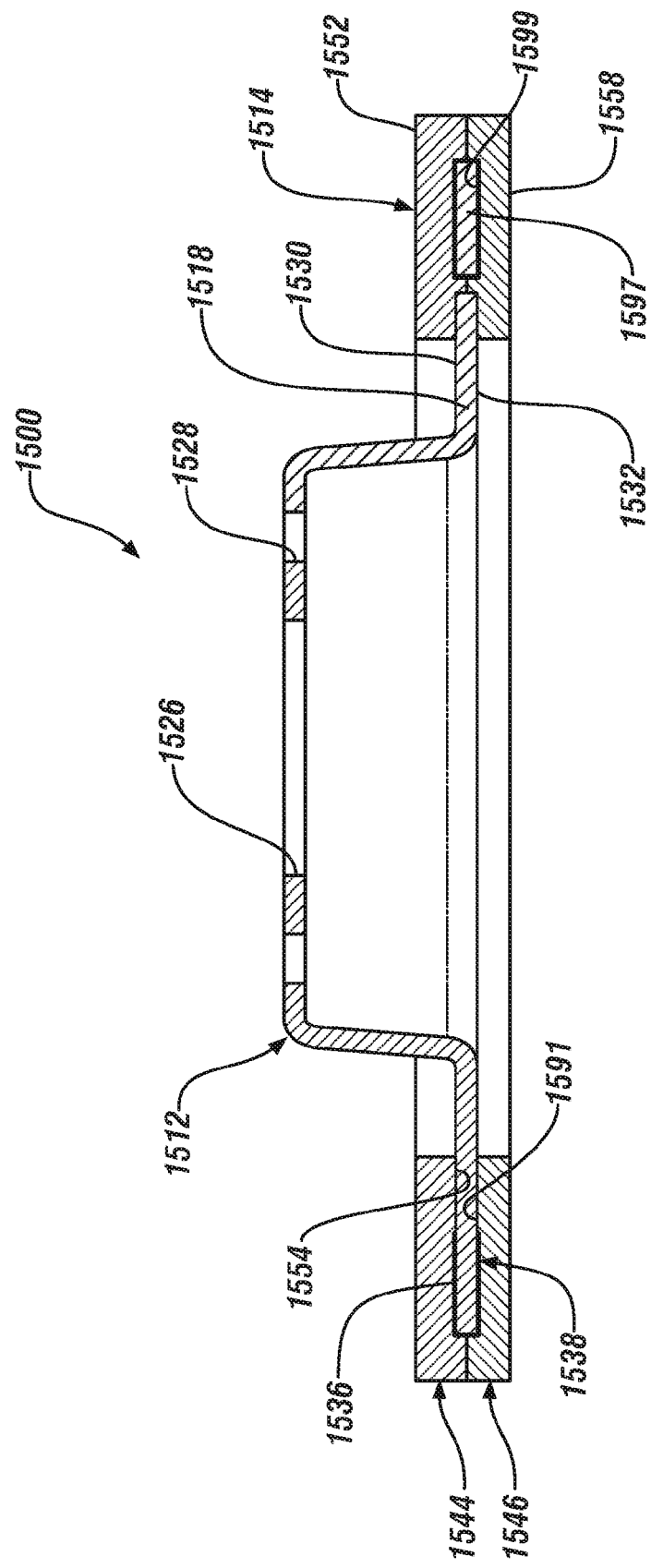
FIG. 15 is a generalized version of a brake rotor intended to encompass the several brake rotor embodiments shown in FIGS. 1-13. This generalized brake rotor is referred to in the description of the method illustrated in FIG. 14, as opposed to the many brake rotor embodiments shown in FIGS. 1-13, for the sake or simplification and brevity.

Any of the disclosed brake rotors 100, 200, 300, 400, 600, 800, 900, 1000, 1200, 1300 may be manufactured by the method 1450 schematically illustrated in FIG. 14. This method generally comprises a rotor hat forming step 1460, a vibration damping element preparation step 1470, and a rotor cheek forming step 1480. The differences between the various brake rotors 100, 200, 300, 400, 600, 800, 900, 1000, 1200, 1300 can be easily accommodated by modifying either one of these three steps. A generalized brake rotor construction denoted by reference numeral 1500, which is intended to encompass each of the brake rotors 100, 200, 300, 400, 600, 800, 900, 1000, 1200, 1300 described above, is therefore depicted in FIG. 15 for the sake of simplifying the discussion of the brake rotor manufacturing method 1450. Like numerals are used in the generalized brake rotor 1500 to refer to like aspects of the brake rotors 100, 200, 300, 400, 600, 800, 900, 1000, 1200, 1300 of the first through tenth embodiments, with the left side of the brake rotor 1500 showing a friction-enhancing coating 1536 on a peripheral radial segment 1538 of both the first and second annular surfaces 1530, 1532 of the flange 1518 and the right side of the brake rotor 1500 showing an annular band 1597. Other brake rotor embodiments besides the ones specifically illustrated in FIGS. 1-13 may of course be manufactured by the same method.

The rotor hat forming step 1460 involves forming the rotor hat 1512, for example, in a stamping press from a thin steel sheet of suitable size and thickness. The stamping press typically includes a lower die block and an upper die block. The lower die block has a lower die block surface and the upper die block has a complimentary upper die block surface which, together, are used to deform the thin steel sheet. Each of the lower die block surface and the upper die block surface are preferably formed from a hard tool alloy. A dry or liquid lubricant may be applied to either or both of the thin steel sheet and the die block surfaces before stamping to prevent material buildup on the die block surfaces and the associated marring of a subsequently stamped thin steel sheet.

The thin steel sheet is first placed between the lower die block surface and the upper die block surface when the lower and upper die blocks are separated. A series of guides or other related positioning elements hold the thin steel sheet in place at the correct location. An applied force—usually pneumatic or hydraulic—is then directed at either the lower die block, the upper die block, or both, to bring the die blocks together and press the lower die block surface and the upper die block surface against opposed faces of the thin steel sheet. The pressed engagement of the die block surfaces stamps the thin steel sheet into the rotor hat 1512. Any of the bore 1526, the bolt holes 1528, the mechanical fasteners (shown in FIGS. 2, 3, and 10-11) or the holes (shown in FIGS. 4-7 and 12) can be formed within the stamping press by encroachment of the lower and upper die surfaces or they may be separately formed outside of the stamping press by drilling or another suitable procedure.

The vibration damping element preparation step 1470 is performed after the rotor hat 1512 is removed from the stamping press. This step 1470 includes applying the friction-enhancing coating 1536 to the peripheral radial segment 1538 between at least one of annular surface 1530, 1532 of the flange 1518 and at least one of the undersides 1554, 1591 of the rotor cheek halves 1544, 1546 or positioning the annular band 1597 in the retention feature 1599, or a part of the retention feature 1599, defined by the first or second rotor cheek half 1544, 1546 (one or both of which may be the vented type). Any suitable coating technique may be employed to apply the friction-enhancing coating composition to the peripheral radial segment 1538 of the first and/or second annular surfaces 1530, 1532. Spraying, brushing, dipping, doctor blading, slot die coating, and comma bar coating are just some of the coating techniques that may be used. The applied friction-enhancing coating composition may be afforded drying time or subjected to heat or another curing facilitator, depending on its specific composition, in order to harden it into the friction-enhancing coating 1536. A single coating application or several coating applications may be performed at the peripheral radial segment 1538 depending on the precision of the coating technique utilized. Positioning the annular band 1597 in the retention feature 1599 or a part of the retention feature 1599 (i.e., in half of the enclosed channel on one of the rotor cheek halves 1544, 1546) may be accomplished by any manual or automated technique available to skilled artisans.

The rotor cheek forming step 1480 involves fixedly securing the rotor cheek 1514 to the flange 1518 of the rotor hat 1512 over the vibration damping element. The first and second rotor cheek halves 1544, 1546 may be fabricated in a solid (FIGS. 1-5 and 8-12) or vented (FIGS. 6-7 and 13) configuration by standard casting methods such as a sand casting, plaster casting, or die casting, or by some other metal forming method known to skilled artisans. Each of the first and second braking surfaces 1552, 1558 may further be hardened by ferritic nitrocarburization (FNC) to improve wear and corrosion resistance. Ferritic nitrocarburization encompasses a wide variety of processes in which nitrogen and carbon are diffused, as relevant here, into a cast iron material at an elevated temperature within the ferritic phase of the cast iron material. Such a temperature usually falls somewhere between 525° C. to 625° C. The diffusion of nitrogen and carbon through the first and/or second braking surfaces 1552, 1558 introduces nitrides and carbides into the first and/or second rotor cheek halves 1544, 1546 adjacent to the first and/or second braking surfaces 1552, 1558. These compounds provide the desired hardening effect. The ferritic nitrocarburization of the first and/or second rotor cheek halves 1552, 1558 is preferably achieved by salt bath or gaseous FNC.

The first and second rotor cheek halves 1544, 1546 may be fixedly secured to the flange 1518 by, for example, welding, brazing, mechanical fastening, or some other suitable technique. Welding and brazing can be used to form any of the metallurgical joints shown and described in FIGS. 1-2, 4, 6, 8-10, and 13. Any suitable type of welding may be practiced including resistance seam welding, arc welding such as gas metal arc welding (GMAW), flux-cored arc welding (GCAW), or gas tungsten arc welding (GTAW), energy beam welding, or solid-state welding such as friction stir welding or induction welding. Mechanical fasteners, such as concentric ridges and rivets, can be used to fasten the first and second rotor cheek halves 1544, 1546 to each other and/or to the flange 1518 as shown and described in FIGS. 2-7 and 9-13. The welding, brazing, and/or mechanical fastening techniques employed to fixedly secure the first and second rotor cheek halves 1544, 1546 to the flange 1518 can be administered by manual or automated procedures as understood by skilled artisans.

Any additional machining or refinishing still required to finish construction of the brake rotor 1500 may now be accomplished. The brake rotor 1500 manufactured by this process is light weight, on account of the steel rotor hat 1512 and the less overall use of cast iron, and sound-damped, on account of the vibration damping element included in the rotor cheek 1514 between the first and second braking surfaces 1552, 1558. The brake rotor 1500 thus contributes less weight to the vehicle braking system than conventional cast iron brake rotors and, additionally, disrupts the vibration propagation that may develop during a wide range of driving conditions—most especially during from braking events that selectively press closely-situated brake pads against the braking surfaces 1552, 1558 of the rotor cheek 1514.

While the detailed description of the several brake rotor embodiments describes the construction of the rotor cheek 114, 214, 314, 414, 614, 814, 914, 1014, 1314 with two rotor cheek halves, it should be understood that rotor cheeks of equivalent structure and functionality can be manufactured from more than two rotor pieces, such three to eight pieces, by implementing the same teachings and principles set forth above, even though such rotor cheeks are not explicitly shown in Figures. The above description of preferred exemplary embodiments is merely descriptive in nature and not intended to limit the scope of the claims that follow. Each of the terms used in the appended claims should be given its ordinary and customary meaning unless specifically stated otherwise in the specification.

The invention claimed is:

1. A sound-damped brake rotor, for a vehicle braking system, that co-rotates with a vehicle wheel in close relationship to one or more brake pads that can be selectively applied against the brake rotor to slow the rotational speed of the wheel, the brake rotor comprising:

a steel rotor hat that comprises an axially-protruding central hub along a longitudinal axis of the rotor hat and a flange that extends radially from and circumferentially around the central hub, the flange having a first annular surface and a second annular surface opposite the first annular surface;

a rotor cheek which concentrically surrounds the central hub about the longitudinal axis and is supported by the rotor hat, the rotor cheek providing at least one axially-facing annular braking surface and being constructed from two separate and distinct cast iron rotor cheek halves that are fixedly secured to the rotor hat, wherein a first rotor cheek half includes a first outer circumferential edge and a first inner circumferential edge and a second rotor cheek half includes a second outer circumferential edge and a second inner circumferential edge, the first inner circumferential edge forming a first circumferential flange seam with the first annular surface, the second inner circumferential edge forming a second circumferential flange seam with the second annular surface, the first and second outer circumferential edges abutting along a circumferential edge seam and together forming a rotor cheek edge, and wherein the first and second rotor cheek halves are fixedly secured to the flange of the rotor hat by at least one of a rotor cheek edge metallurgical joint situated along the circumferential edge seam, a first flange metallurgical joint situated along the first circumferential flange seam, or a second flange metallurgical joint situated along the second circumferential flange seam; and a vibration damping element located within the rotor cheek beneath the at least one braking surface, the vibration damping element facilitating a physically distinct, non-bonded, surface-to-surface interface where relative frictional contacting movement can occur when vibrations are imparted to the rotor cheek.

2. The sound-damped brake rotor set forth in claim 1, wherein the two rotor cheek halves are fixedly secured to the flange of the rotor hat by at least one mechanical fastener in addition to the at least one of the rotor cheek edge metallurgical joint, the first flange metallurgical joint, or the second flange metallurgical joint.

3. The sound-damped brake rotor set forth in claim 2, wherein the at least one mechanical fastener comprises at least one of a concentric ridge formed on the flange of the rotor cheek, a plurality of rivets formed on the first and second annular surfaces of the rotor hat that are received by a plurality of openings in the two or more rotor cheek pieces, or a plurality of rivets formed on the two or more rotor cheek pieces that traverse the thickness of the flange through a plurality of holes and are received in a plurality of openings formed on the two or more rotor cheek pieces opposite the plurality of rivets.

4. The sound-damped brake rotor set forth in claim 1, wherein the vibration damping element comprises a friction-enhancing coating applied to at least one of the first annular surface, the second annular surface, or both the first annular surface and the second annular surface.

5. The sound-damped brake rotor set forth in claim 4, wherein the friction enhancing coating comprises a refractory material component and a binder.

6. The sound-damped brake rotor set forth in claim 5, wherein the refractory material component comprises at least one of graphite, alumina, silica, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, vermiculite, kaolinite, muscovite, or a fire clay, and wherein the binder comprises at least one of an epoxy resin, a vinyl ester resin, a lignosulfonate binder, a calcium aluminate cement, or a wood flour cement.

7. The sound-damped brake rotor set forth in claim 1, wherein the vibration damping element comprises a band, separate and distinct from both the rotor hat and the rotor cheek, confined in a retention feature within the rotor cheek.

8. The sound-damped brake rotor set forth in claim 7, wherein the band is annular in shape, and wherein the retention feature is an enclosed channel, formed jointly by the two or more rotor cheek pieces, corresponding in size and shape to the annular band.

9. The sound-damped brake rotor set forth in claim 1, wherein the first rotor cheek half provides an axially-facing first annular braking surface and the second rotor cheek half provides an axially-facing second annular braking surface opposite the first annular braking surface.

10. The sound-damped brake rotor set forth in claim 2, wherein the first and second rotor cheek halves are fixedly secured to the flange of the rotor hat by at least one of the following mechanical fasteners:

(a) a concentric ridge formed on the flange and defining a peak and a trough, the peak being accommodated in a channel formed on the first or second rotor cheek half and the trough being accommodated by a protrusion formed on the other of the first or second rotor cheek half;
(b) a plurality of rivets alternately formed in circumferential spaced relation on the first and second annular surfaces of the flange of the rotor hat, the plurality of rivets being received in a plurality of correspondingly sized openings defined in the first and second rotor cheek halves; or
(c) a plurality of rivets formed in circumferential spaced relation on each of the first and second rotor cheek halves that extend through holes defined in the flange of the rotor hat and are received in a plurality of openings defined in the other of the first and second rotor cheek halves.

11. A sound-damped brake rotor, for a vehicle braking system, that co-rotates with a vehicle wheel in close relationship to one or more brake pads that can be selectively applied against the brake rotor to slow the rotational speed of the wheel, the brake rotor comprising:
a rotor hat that comprises an axially-protruding central hub along a longitudinal axis of the rotor hat and a flange that extends radially from and circumferentially around the central hub, the flange having a first annular surface and a second annular surface opposite the first annular surface;
a rotor cheek supported by the rotor hat and being constructed from a first rotor cheek half and a second rotor cheek half which are fixedly secured to the flange of the rotor hat, the first rotor cheek half being located adjacent to the first annular surface and providing an axially-facing first annular braking surface, the second rotor cheek half being located adjacent to the second annular surface and providing an axially-facing second annular braking surface opposite the first annular braking surface, and wherein a concentric ridge is formed on the flange to define a peak and a trough, the peak being accommodated in a channel formed on the first or second rotor cheek half and the trough being accommodated by a protrusion formed on the other of the first or second rotor cheek half; and
a vibration damping element located within the rotor cheek between the first and second braking surfaces, the vibration damping element facilitating a physically distinct, non-bonded, surface-to-surface interface where relative frictional contacting movement can occur when vibrations are imparted to the rotor cheek.

12. The sound-damped brake rotor set forth in claim 11, wherein the first rotor cheek half includes a first outer circumferential edge and a first inner circumferential edge and the second rotor cheek half includes a second outer circumferential edge and a second inner circumferential edge, the first inner circumferential edge forming a first circumferential flange seam with the first annular surface, the second inner circumferential edge forming a second circumferential flange seam with the second annular surface, the first and second outer circumferential edges abutting along a circumferential edge seam and together forming a rotor cheek edge, and wherein a metallurgical joint is formed along at least one of the circumferential edge seam, the first circumferential flange seam, or the second circumferential flange seam.

13. The sound-damped brake rotor set forth in claim 11, wherein the first and second rotor cheek halves are fixedly secured to the flange of the rotor hat by at least one of the following in addition to the concentric ridge:
a plurality of rivets formed in circumferential spaced relation on the first and second annular surfaces of the flange of the rotor hat, the plurality of rivets being received in a plurality of correspondingly sized openings defined in the first and second rotor cheek halves;
a plurality rivets formed in circumferential spaced relation on each of the first and second rotor cheek halves that extend through holes defined in the flange of the rotor hat and are received in a plurality of openings defined in the other of the first and second rotor cheek halves; or.

14. The sound-damped brake rotor set forth in claim 11, wherein at least one of the first or second rotor cheek halves comprises a first annular plate, a second annular plate axially-displaced from the first annular plate, and a plurality of internal partitions situated between the first and second annular plates that define a plurality of radially-extending vanes being open to the atmosphere.

15. The sound-damped brake rotor set forth in claim 11, wherein the vibration damping element comprises at least one of the following:
(a) a friction-enhancing coating applied to at least one of the first annular surface, the second annular surface, or both the first annular surface and the second annular surface, the friction-enhancing coating comprising a refractory material component and a binder; or
(b) an annular band, separate and distinct from both the rotor hat and the rotor cheek, confined in a an enclosed channel formed jointly by the first and second rotor cheek halves and corresponding in size and shape to the annular band.

16. A method of manufacturing a sound-damped brake rotor that co-rotates with a vehicle wheel in close relationship to one or more brake pads that can be selectively applied against the brake rotor to slow the rotational speed of the wheel, the method comprising:
forming a rotor hat that comprises an axially-protruding central hub along a longitudinal axis of the rotor hat and a flange that extends radially from and circumferentially around the central hub, the flange having a first annular surface and a second annular surface opposite the first annular surface;
preparing a vibration damping element that facilitates a physically distinct, non-bonded, surface-to-surface interface where relative frictional contacting movement can occur within the brake rotor, the act of preparing a vibration damping element comprising at least one of (a) applying a friction-enhancing coating to at least one of the first annular surface, the second annular surface, or both the first annular surface and the second annular surface, the friction-enhancing coating comprising a refractory material component and a binder, or (b) positioning a band in a retention feature, or a part of the retention feature, defined by the first or second rotor cheek half; and
fixedly securing a first rotor cheek half and a second rotor cheek half, which are separate and distinct pieces, to the flange of the rotor hat over the vibration damping element to form a rotor cheek that provides at least one axially-facing annular braking surface, the rotor cheek halves being fixedly secured to the flange of the rotor hat by forming a metallurgical joint along a circumferential edge seam formed between abutting outer circumferential edges of the first rotor cheek half and the second rotor cheek half or forming a metallurgical joint along at least one of a first circumferential flange seam formed between an inner circumferential edge of the first rotor cheek half and the first annular surface or a second circumferential flange seam formed between an inner circumferential edge of the second rotor cheek half and the second annular surface.

17. The method set forth in claim 16, wherein fixedly securing the first and second rotor cheek halves to the flange of the rotor hat further comprises fastening the first and second rotor cheek halves to the flange with a mechanical fastener, the mechanical fastener comprising at least one of the following:
   (a) at least one concentric ridge formed on the flange of the rotor cheek;
   (b) a plurality or rivets formed on the first and second annular surfaces of the flange that are received by a plurality of openings defined in the first and second rotor cheek halves; or
   (c) a plurality of rivets formed on the first and second rotor cheek halves that traverse the thickness of the flange through a plurality of holes and are received in a plurality of openings defined in the first and second rotor cheek halves opposite the plurality of rivets.

\* \* \* \* \*